United States Patent
Oshima et al.

(10) Patent No.: US 10,350,864 B2
(45) Date of Patent: Jul. 16, 2019

(54) THERMOPLASTIC POLYMER COMPOSITION, LAYERED BODY, AND PROTECTIVE FILM

(71) Applicant: KURARAY CO., LTD., Kurashiki-shi (JP)

(72) Inventors: Hiroshi Oshima, Tsukuba (JP); Toshiyuki Zento, Tsukuba (JP); Naoto Fukuhara, Tsukuba (JP); Shinya Oshita, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 441 days.

(21) Appl. No.: 15/025,002

(22) PCT Filed: Sep. 24, 2014

(86) PCT No.: PCT/JP2014/075292
§ 371 (c)(1),
(2) Date: Mar. 25, 2016

(87) PCT Pub. No.: WO2015/046251
PCT Pub. Date: Apr. 2, 2015

(65) Prior Publication Data
US 2016/0243799 A1    Aug. 25, 2016

(30) Foreign Application Priority Data

Sep. 25, 2013  (JP) .................................. 2013-198809

(51) Int. Cl.
| | | |
|---|---|---|
| B32B 27/32 | (2006.01) |
| B32B 7/12 | (2006.01) |
| B32B 27/08 | (2006.01) |
| C08L 33/10 | (2006.01) |
| C08L 23/08 | (2006.01) |
| C08L 53/02 | (2006.01) |
| C09J 7/38 | (2018.01) |
| C09J 133/08 | (2006.01) |
| B32B 27/30 | (2006.01) |
| C09J 7/24 | (2018.01) |

(52) U.S. Cl.
CPC ............... *B32B 27/32* (2013.01); *B32B 7/12* (2013.01); *B32B 27/08* (2013.01); *B32B 27/302* (2013.01); *B32B 27/308* (2013.01); *C08L 23/0853* (2013.01); *C08L 33/10* (2013.01); *C08L 53/02* (2013.01); *C08L 53/025* (2013.01); *B32B 2250/03* (2013.01); *B32B 2250/24* (2013.01); *B32B 2405/00* (2013.01); *B32B 2457/00* (2013.01); *B32B 2457/20* (2013.01); *C08L 2205/03* (2013.01); *C08L 2205/06* (2013.01); *C08L 2666/68* (2013.01); *C09J 7/243* (2018.01); *C09J 7/385* (2018.01); *C09J 7/387* (2018.01); *C09J 133/08* (2013.01); *C09J 2201/606* (2013.01); *C09J 2423/103* (2013.01); *C09J 2433/00* (2013.01); *C09J 2453/00* (2013.01)

(58) Field of Classification Search
None
See application file for complete search history.

(56) References Cited

U.S. PATENT DOCUMENTS

| | | | | |
|---|---|---|---|---|
| 5,814,685 A | * | 9/1998 | Satake .................. | C09D 11/326 347/100 |
| 6,140,418 A | * | 10/2000 | Yamashita .............. | C08L 23/22 525/191 |
| 6,558,790 B1 | * | 5/2003 | Holguin .................... | C09J 4/00 428/355 R |

(Continued)

FOREIGN PATENT DOCUMENTS

| | | |
|---|---|---|
| CN | 1649958 A | 8/2005 |
| EP | 1 498 455 A1 | 1/2005 |

(Continued)

OTHER PUBLICATIONS

Machine translation of JP 2010018796 A (2010).*
Machine translation of JP 05230322 A (Year: 1993).*
Combined Chinese Office Action and Search Report dated May 27, 2017 in Patent Application No. 201480052955.X (with English translation of categories of cited documents).
International Search Report dated Dec. 22, 2014 in PCT/JP2014/075292 filed Sep. 24, 2014.

(Continued)

*Primary Examiner* — Frank D Ducheneaux
(74) *Attorney, Agent, or Firm* — Oblon, McClelland, Maier & Neustadt, L.L.P.

(57) ABSTRACT

Provided is a thermoplastic polymer composition containing an aromatic vinyl-based block copolymer (a-1) having a number average molecular weight of 30,000 to 200,000, the aromatic vinyl-based block copolymer containing a polymer block F containing a structural unit derived from an aromatic vinyl-based monomer as a main component and a hydrogenated or non-hydrogenated polymer block G containing a structural unit derived from a conjugated diene monomer or an isobutylene monomer as a main component; an acrylic polymer (a-2); an olefin-based polymer containing polar groups (a-3); and a softening agent (a-4), at the proportions that satisfy the following Expressions (1) to (3):

$$0.05 \leq W_{(a\text{-}2)}/W_{(a\text{-}1)} \leq 9 \tag{1}$$

$$0.1 < W_{(a\text{-}3)}/(W_{(a\text{-}1)}+W_{(a\text{-}2)}+W_{(a\text{-}3)}+W_{(a\text{-}4)}) \leq 0.9 \tag{2, and}$$

$$0 \leq W_{(a\text{-}4)}/(W_{(a\text{-}1)}+W_{(a\text{-}2)}+W_{(a\text{-}3)}+W_{(a\text{-}4)}) \leq 0.5 \tag{3}$$

wherein $W_{(a\text{-}1)}$, $W_{(a\text{-}2)}$, $W_{(a\text{-}3)}$ and $W_{(a\text{-}4)}$ represent the contents (on a mass basis) of the aromatic vinyl-based block copolymer (a-1), acrylic polymer (a-2), olefin-based polymer containing polar groups (a-3) and softening agent (a-4), respectively, in the thermoplastic polymer composition.

19 Claims, No Drawings

(56) References Cited

U.S. PATENT DOCUMENTS

| | | | |
|---|---|---|---|
| 7,070,051 B2* | 7/2006 | Kanner | A61B 17/06133 206/382 |
| 2003/0118770 A1* | 6/2003 | Suwa | C09J 7/40 428/41.5 |
| 2005/0239963 A1 | 10/2005 | Kitano et al. | |
| 2006/0052534 A1* | 3/2006 | Suzuki | C08F 297/04 525/88 |

FOREIGN PATENT DOCUMENTS

| | | |
|---|---|---|
| JP | 5-230322 A | 9/1993 |
| JP | 7-26211 A | 1/1995 |
| JP | 8-157681 A | 6/1996 |
| JP | 2004-250815 A | 9/2004 |
| JP | 2004-299273 A | 10/2004 |
| JP | 2007-197489 | 8/2007 |
| JP | 2009-241348 A | 10/2009 |
| JP | 2010-18796 A | 1/2010 |
| JP | 2012-57040 A | 3/2012 |
| JP | 2012-102172 A | 5/2012 |

OTHER PUBLICATIONS

Extended Search Report dated Apr. 10, 2017 in European Patent Application No. 14849836.3.

* cited by examiner

THERMOPLASTIC POLYMER COMPOSITION, LAYERED BODY, AND PROTECTIVE FILM

CROSS-REFERENCE TO RELATED APPLICATIONS

The present application is a national stage of International Application No. PCT/JP2014/075292, filed Sep. 24, 2014, which claims priority to Japanese Patent Application No. 2013-198809, filed Sep. 25, 2013. The contents of these applications are incorporated herein by reference in their entirety.

TECHNICAL FIELD

The present invention relates to a thermoplastic polymer composition including an aromatic vinyl-based block copolymer having a polymer block containing a structural unit derived from an aromatic vinyl-based monomer as a main component thereof, and a hydrogenated or non-hydrogenated polymer block containing a structural unit derived from a conjugated diene monomer or an isobutylene monomer as a main component thereof, an acrylic polymer; an olefin-based polymer containing a polar group; and optionally, a softening agent, a laminate having a layer formed from the thermoplastic polymer composition, and a protective film formed from the laminate.

BACKGROUND ART

As a method for protecting the surfaces of various materials such as a metal plate, a synthetic resin plate and a glass plate from contamination or damage, technologies of coating the surfaces with so-called protective films have been conventionally used. These protective films generally have a laminated structure that includes a substrate layer and an adhesive layer. The protective films are formed by applying a material for a pressure-sensitive adhesive layer on a substrate layer, or are produced by co-extruding a material for a pressure-sensitive adhesive layer with a material for a substrate layer. From the viewpoints of productivity and the production cost, the latter is industrially preferably employed.

Regarding the protective film, usually, a polyolefin-based polymer is used as a material of the substrate layer, and an acrylic block copolymer is used as a material of the pressure-sensitive adhesive layer. However, because the interlayer adhesive strength between a polyolefin-based polymer, which is a non-polar material, and an acrylic block copolymer, which is a polar material, is weak, in the case of employing a co-extrusion molding processing method, there has been a problem that delamination may easily occur. In order to solve this problem, for example, there have been suggested a method of providing an adhesive layer formed from an ethylene-vinyl acetate copolymer having a particular vinyl acetate concentration, between a substrate layer and a pressure-sensitive adhesive layer (see PTL 1); a method of providing an adhesive layer formed from a styrene-based resin only between a substrate layer and a pressure-sensitive adhesive layer (see PTL 2); a method of irradiating a laminate obtained by co-extrusion molding processing with ionizing radiation (see PTL 3); and a method of incorporating a polyolefin-based polymer into an acrylic block copolymer for a pressure-sensitive adhesive layer (see PTL 4).

CITATION LIST

Patent Literature

[PTL 1] JP-A-2009-241348
[PTL 2] JP-A-2010-018796
[PTL 3] JP-A-2012-057040
[PTL 4] JP-A-2012-102172

SUMMARY OF INVENTION

Technical Problem

It was found by further investigation of the inventors of the present invention that the materials for adhesive layers described in PTL 1 and 2 both have poor co-extrusion processability with acrylic copolymers, and are likely to create variations in the thickness of the pressure-sensitive adhesive products obtainable therefrom. Furthermore, the adhesive force between the materials and a pressure-sensitive adhesive layer formed from an acrylic copolymer is also insufficient, and thus, there is room for improvement. The method of PTL 3 involves irradiation with ionizing radiation through the pressure-sensitive adhesive layer, and therefore, surface roughening of the pressure-sensitive adhesive layer may occur. Furthermore, as in the case of PTL 4, when an acrylic block copolymer and a styrene-based block copolymer are mixed, an insufficiently kneaded state is likely to be attained due to compatibility or the difference in fluidity, and there is a tendency that the pressure-sensitive adhesion performance may become unstable. Thus, there is room for improvement.

Therefore, it is an object of the invention to provide a polymer composition having excellent co-extrusion molding processability with a polyolefin-based polymer composition and an acrylic pressure-sensitive adhesive; to provide a laminate that is not easily delaminated, which has an adhesive layer formed from the aforementioned polymer composition between a substrate layer formed from a polyolefin-based polymer composition and a pressure-sensitive adhesive layer formed from an acrylic pressure-sensitive adhesive; and to provide a protective film formed from the aforementioned laminate.

Solution to Problem

The inventors of the present invention conducted a thorough investigation, and as a result, it was found that the problems described above can be solved by using a polymer composition including a particular aromatic vinyl-based block copolymer, an acrylic polymer, and optionally a softening agent, the polymer composition further including an olefin-based polymer containing polar groups to a certain extent.

The present invention relates to the following [1] to [14].

[1] A thermoplastic polymer composition including:

an aromatic vinyl-based block copolymer (a-1) having a number average molecular weight of 30,000 to 200,000, the aromatic vinyl-based block copolymer (a-1) containing a polymer block F containing a structural unit derived from an aromatic vinyl-based monomer as a main component, and a hydrogenated or non-hydrogenated polymer block G containing a structural unit derived from a conjugated diene monomer or an isobutylene monomer as a main component;

an acrylic polymer (a-2);
an olefin-based polymer containing polar groups (a-3); and
a softening agent (a-4),
at the proportions satisfying the following Expressions (1) to (3):

$$0.05 \leq W_{(a-2)}/W_{(a-1)} \leq 9 \quad (1)$$

$$0.1 < W_{(a-3)}/(W_{(a-1)}+W_{(a-2)}+W_{(a-3)}+W_{(a-4)}) \leq 0.9 \quad (2), \text{ and}$$

$$0 \leq W_{(a-4)}/(W_{(a-1)}+W_{(a-2)}+W_{(a-3)}+W_{(a-4)}) \leq 0.5 \quad (3)$$

wherein $W_{(a-1)}$, $W_{(a-2)}$, $W_{(a-3)}$ and $W_{(a-4)}$ represent the contents (on a mass basis) of the aromatic vinyl-based block copolymer (a-1), acrylic polymer (a-2), olefin-based polymer containing polar groups (a-3) and softening agent (a-4), respectively, in the thermoplastic polymer composition.

[2] The thermoplastic polymer composition according to the above [1], wherein the ratio between the shear viscosity $\eta Ea$ (Pa·s) at a shear velocity 1 (1/s) measured at 210° C. and the shear viscosity $\Theta Eb$ (Pa·s) at a shear velocity 100 (1/s) measured at 210° C., ($\eta Ea/\eta Eb$), is 10 or less.

[3] The thermoplastic polymer composition according to the above [1] or [2], wherein the aromatic vinyl-based block copolymer (a-1) has a polymer block F having a number average molecular weight of 1,000 to 50,000 and containing a structural unit derived from an aromatic vinyl-based monomer as a main component; and a polymer block G containing a polymer block g1, which is a polymer block having a number average molecular weight of 1,000 to 30,000 and in which the content of a 1,4-bond structural unit derived from a conjugated diene monomer that constitutes the polymer block is less than 30 mol %, and a polymer block g2, which is a polymer block having a number average molecular weight of 25,000 to 190,000 and in which the content of a 1,4-bond structural unit derived from a conjugated diene monomer that constitutes the polymer block is 30 mol % or more, and the aromatic vinyl-based block copolymer contains at least one (F-g1-g2) structure.

[4] The thermoplastic polymer composition according to any one of the above [1] to [3], wherein the aromatic vinyl-based monomer is α-methylstyrene.

[5] The thermoplastic polymer composition according to any one of the above [1] to [4], wherein the olefin-based polymer having polar groups (a-3) is at least one selected from an ethylene-vinyl acetate copolymer, an ethylene-(meth)acrylic acid ester copolymer, and an ethylene-(meth) acrylic acid copolymer.

[6] A laminate including:
a layer (A) formed from the thermoplastic polymer composition according to any one of the above [1] to [5];
a pressure-sensitive adhesive layer (B) containing an acrylic pressure-sensitive adhesive; and
a substrate layer (C) containing a polyolefin-based polymer,
the laminate having these layers laminated in the order of (B)-(A)-(C).

[7] The laminate according to the above [6], wherein the acrylic pressure-sensitive adhesive contains an acrylic block copolymer (b-1) having at least one polymer block (I-1) composed of a structural unit derived from a methacrylic acid ester and at least one polymer block (I-2) composed of a structural unit derived from an acrylic acid ester.

[8] The laminate according to the above [7], wherein the content of the polymer block (I-1) in the acrylic block copolymer (b-1) is 5% by mass to 50% by mass.

[9] The laminate according to the above [7] or [8], wherein the structural unit derived from an acrylic acid ester, which constitutes the polymer block (I-2), is derived from an acrylic acid ester (i-1) represented by general formula: $CH_2=CH-COOR^1$ (P) (wherein $R^1$ represents an organic group having 4 to 6 carbon atoms); and an acrylic acid ester (i-2) represented by general formula: $CH_2=CH-COOR^2$ (Q) (wherein $R^2$ represents an organic group having 7 to 12 carbon atoms), and the mass ratio between the acrylic acid ester (i-1) and the acrylic acid ester (i-2), [(i-1)/(i-2)], is 90/10 to 10/90.

[10] The laminate according to any one of the above [6] to [9], wherein the ratio between the shear viscosity $\eta Ex$ (Pa·s) at a shear velocity 1 (1/s) measured at 210° C. and the shear viscosity $\eta Ey$ (Pa·s) at a shear velocity 100 (1/s) measured at 210° C. of the acrylic pressure-sensitive adhesive, ($\eta Ex/\eta Ey$), is 25 or less.

[11] The laminate according to any one of the above [6] to [10], wherein the absolute value of the difference between the ratio between the shear viscosity $\eta Ea$ (Pa·s) at a shear velocity 1 (1/s) measured at 210° C. and the shear viscosity $\eta Eb$ (Pa·s) at a shear velocity 100 (1/s) measured at 210° C. of the thermoplastic polymer composition, ($\eta Ea/\eta Eb$), and the ratio between the shear viscosity $\eta Ex$ (Pa·s) at a shear velocity 1 (1/s) measured at 210° C. and the shear viscosity $\eta Ey$ (Pa·s) at a shear velocity 100 (1/s) measured at 210° C. of the acrylic pressure-sensitive adhesive, ($\eta Ex/\eta Ey$), is 10 or less.

[12] The laminate according to any one of the above [6] to [11], wherein the polyolefin-based polymer that constitutes the substrate layer (C) is a polypropylene-based polymer.

[13] The laminate according to any one of the above [6] to [12], wherein the layers of (A) to (C) are laminated by a co-extrusion molding processing method.

[14] A protective film formed from the laminate according to any one of the above [6] to [13].

Advantageous Effects of Invention

According to the invention, a polymer composition having excellent co-extrusion molding processability with a polyolefin-based polymer composition and an acrylic pressure-sensitive adhesive may be provided, and a laminate that is not easily delaminated, which has an adhesive layer formed from the aforementioned polymer composition between a substrate layer formed from a polyolefin-based polymer composition and a pressure-sensitive adhesive layer formed from an acrylic pressure-sensitive adhesive, can be provided.

Furthermore, since the laminate of the invention is not easily delaminated, the pressure-sensitive adhesive layer of the surface layer can sufficiently exhibit pressure-sensitive adhesive characteristics. Additionally, since less adhesion occurs when the laminate is processed into a roll form, mass production can be achieved by co-extrusion molding processing, and thus, it is industrially useful. Meanwhile, in a case in which mass production is implemented by co-extrusion molding processing, production costs are decreased compared to the case in which a laminate is produced by a coating method using a solution type pressure-sensitive adhesive, and the environmental load is also reduced.

DESCRIPTION OF EMBODIMENTS

[Thermoplastic Polymer Composition]

The thermoplastic polymer composition of the invention is a thermoplastic polymer composition including an aromatic vinyl-based block copolymer (a-1) having a number average molecular weight of 30,000 to 200,000, which contains a polymer block F containing a structural unit derived from an aromatic vinyl-based monomer as a main component and a hydrogenated or non-hydrogenated polymer block G containing a structural unit derived from a conjugated diene monomer or an isobutylene monomer as a main component; an acrylic polymer (a-2); an olefin-based polymer containing polar groups (a-3); and a softening agent (a-4), at proportions that satisfy the following Expressions (1) to (3):

$$0.05 \leq W_{(a-2)}/W_{(a-1)} \leq 9 \quad (1)$$

$$0.1 \leq W_{(a-3)}/(W_{(a-1)}+W_{(a-2)}+W_{(a-3)}+W_{(a-4)}) \leq 0.9 \quad (2)$$

$$0.5 \leq W_{(a-4)}/(W_{(a-1)}+W_{(a-2)}+W_{(a-3)}+W_{(a-4)}) \leq 0.5 \quad (3)$$

wherein $W_{(a-1)}$, $W_{(a-2)}$, $W_{(a-3)}$ and $W_{(a-4)}$ represent the contents (on a mass basis) of the aromatic vinyl-based block copolymer (a-1), acrylic polymer (a-2), olefin-based polymer containing polar groups (a-3) and softening agent (a-4), respectively, in the thermoplastic polymer composition.

[Aromatic Vinyl-Based Block Copolymer (a-1)]

(Polymer Block F)

The polymer block F in the aromatic vinyl-based block copolymer (a-1) contains a structural unit derived from an aromatic vinyl-based monomer as a main component. The phrase "containing . . . as a main component" as used herein means that the polymer block F contains a structural unit derived from an aromatic vinyl-based monomer at a proportion of 50% by mass or more based on the total mass of the polymer block F. The content of the structural unit derived from an aromatic vinyl-based monomer in the polymer block F is more preferably 70% by mass or more, and even more preferably 90% by mass or more, based on the total mass of the polymer block F, from the viewpoints of the transparency of the thermoplastic polymer composition and mechanical properties.

Examples of the aromatic vinyl-based monomer include styrene, o-methylstyrene, m-methylstyrene, p-methylstyrene, α-methylstyrene, α-methylstyrene, 2,6-dimethylstyrene, 2,4-dimethylstyrene, α-methyl-o-methylstyrene, α-methyl-m-methylstyrene, α-methyl-p-methylstyrene, p-methyl-o-methylstyrene, o-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-, m- or p-bromomethylstyrene, a styrene derivative substituted with a silyl group, indene, and vinylnaphthalene. Among these, from the viewpoints of the balance between production cost and physical properties, styrene, α-methylstyrene, and a mixture thereof are preferred, and from the viewpoint of delamination resistance (particularly, delamination resistance between the polymer composition and a pressure-sensitive adhesive layer), α-methylstyrene is more preferred.

However, as long as the purpose and the effects of the invention are not impaired, the polymer block F may contain an unsaturated monomer other than an aromatic vinyl-based monomer at a proportion of 10% by mass or less. Regarding the other unsaturated monomer, for example, at least one selected from butadiene, isoprene, 2,3-dimethyl-1,3-butadiene, 1,3-pentadiene, 1,3-hexadiene, isobutylene, styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylenenorbornene, and 2-methylenetetrahydrofuran may be employed. The form of bonding in the case in which the polymer block F contains the other unsaturated monomer unit is not particularly limited, and the form of bonding may be any of a random form or a tapered form.

The number average molecular weight of the polymer block F in the aromatic vinyl-based block copolymer (a-1) is preferably 1,000 to 50,000, and more preferably 2,000 to 40,000. Meanwhile, the "number average molecular weights" described in the present specification and the claims are all number average molecular weights determined by a gel permeation chromatography (GPC) analysis and calculated relative to polystyrene standards.

The content of the polymer block F in the aromatic vinyl-based block copolymer (a-1) is preferably 5% by mass to 45% by mass, and more preferably 15% by mass to 40% by mass, from the viewpoints of the rubber elasticity and flexibility of the layer formed from the thermoplastic polymer composition. Meanwhile, the content of the polymer block F in the aromatic vinyl-based block copolymer (a-1) can be determined by, for example, $^1$H-NMR spectroscopy.

(Polymer Block G)

The polymer block G in the aromatic vinyl-based block copolymer (a-1) contains a structural unit derived from a conjugated diene monomer or an isobutylene monomer as a main component, and preferably contains a structural unit derived from a conjugated diene monomer as a main component. Meanwhile, such a structural unit may be hydrogenated. The phrase "containing . . . as a main component" as used herein means that the polymer block G contains a structural unit derived from a conjugated diene monomer or a structural unit derived from an isobutylene monomer at a proportion of 50% by mass or more based on the total mass of the polymer block G. The content of the structural unit derived from a conjugated diene monomer or the structural unit derived from an isobutylene monomer in the polymer block G is more preferably 70% by mass or more, and even more preferably 90% by mass or more, based on the total mass of the polymer block G.

Regarding the conjugated diene monomer that constitutes the polymer block G, for example, at least one selected from butadiene, isoprene, 2,3-dimethyl-1,3-butadiene, 1,3-pentadiene, and 1,3-hexadiene may be employed. Among them, butadiene, isoprene, and a mixture of butadiene and isoprene are preferred.

In a case in which the polymer block G contains a structural unit derived from a conjugated diene monomer as a main component, the microstructure of the structural unit derived from a conjugated diene monomer is not particularly limited. For example, in a case in which the polymer block G contains a structural unit derived from a butadiene monomer as a main component, the content of the 1,4-bond structural unit thereof (hereinafter, simply referred to as the amount of 1,4-bonds) is preferably 10 mol % to 95 mol %, and more preferably 30 mol % to 80 mol %. On the other hand, in a case in which the polymer block G contains a structural unit derived from an isoprene monomer as a main component, or contains a structural unit derived from a mixture of a butadiene monomer and an isoprene monomer as a main component, the amount of 1,4-bonds thereof is 5 mol % to 99 mol %, and more preferably 30 mol % to 97 mol %.

Furthermore, in a case in which the polymer block G is composed of a structural unit derived from two or more kinds of conjugated diene monomers (for example, butadiene and isoprene), there are no particular limitations on the form of bonding thereof, and the form of bonding may be any of a random form, a tapered form, a complete alternate form, a partial block form, a block form, or a combination of two or more kinds thereof.

Meanwhile, in a case in which the polymer block G contains a structural unit derived from a conjugated diene monomer as a main component, from the viewpoints of heat resistance and weather resistance, it is preferable that 50 mol % or more of the carbon-carbon double bonds in the structural unit derived from a conjugated diene monomer is hydrogenated (hereinafter, may be briefly described as hydrogenated), it is more preferable that 70 mol % or more is hydrogenated, and it is even more preferable that 90 mol % or more is hydrogenated. Meanwhile, the hydrogenation ratio described above is a value obtained by calculating the contents of carbon-carbon double bonds in the structural unit derived from a conjugated diene monomer in the polymer block G, before and after hydrogenation, using $^1$H-NMR spectroscopy.

Meanwhile, as long as the purpose and the effects of the invention are not impaired, the polymer block G may contain a structural unit derived from a polymerizable monomer other than a conjugated diene monomer and an isobutylene monomer, usually at a proportion of preferably 30% by mass or less, and more preferably 10% by mass or less, based on the total mass of the polymer block G. Regarding the other polymerizable monomer, for example, at least one aromatic vinyl compound selected from styrene, α-methylstyrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylenenorbornene, and 2-methylenetetrahydrofuran may be preferably employed. In a case in which the polymer block G contains a structural unit derived from a monomer of a polymer other than a conjugated diene monomer and an isobutylene monomer, the form of bonding thereof is not particularly limited, and the form of bonding may be any of a random form or a tapered form.

(Bonding Mode of Polymer Block F and Polymer Block G)

In regard to the aromatic vinyl-based block copolymer (a-1), the form of bonding thereof is not limited as long as the polymer block F and the polymer block G are bonded, and the form of bonding may be any of a straight-chained form, a branched form, a radial form, or a bonding mode combining two or more of these. Among them, the form of bonding between the polymer block F and the polymer block G is preferably a straight-chained form, and when the polymer block F is indicated as F and the polymer block G is indicated as G, examples thereof include a triblock copolymer represented by F-G-F, a tetrablock copolymer represented by F-G-F-G, a pentablock copolymer represented by F-G-F-G-F, and a (F-G)nX type copolymer (wherein X represents a coupled residue, and n represents an integer of 3 or more). Among them, a triblock copolymer (F-G-F) is preferably used from the viewpoints of the ease of production of the aromatic vinyl-based block copolymer (a-1), flexibility, and the like.

Here, according to the present specification, in a case in which polymer blocks of the same kind are bonded in a linear form via a divalent coupling agent or the like, the entirety of the bonded polymer blocks is handled as one polymer block. Thereby, the polymer blocks a polymer block that should be originally strictly described as Y-X-Y (wherein X represents a coupled residue), including the example described above, is generally indicated as Y, except for the case in which the polymer block needs to be distinguished particularly from a single polymer block Y. According to the present specification, since polymer blocks of this kind containing coupled residues are handled as described above, for example, a block copolymer that should be strictly described as F-G-X-G-F (wherein X represents a coupled residue), including coupled residues, is described as F-G-F and is handled as an example of a triblock copolymer.

Furthermore, in the aromatic vinyl-based block copolymer (a-1), a polymer block H composed of another polymerizable monomer may exist in addition to the polymer block F and the polymer block G, to the extent that the purpose of the invention is not impaired. In this case, when the polymer block H is indicated as H, examples of the structure of the block copolymer include a F-G-H type triblock copolymer, a F-G-H-F type tetrablock copolymer, and a F-G-F-H type tetrablock copolymer.

The number average molecular weight of the aromatic vinyl-based block copolymer (a-1) needs to be 30,000 to 200,000, and the number average molecular weight is preferably 35,000 to 180,000, and more preferably 40,000 to 150,000. If the number average molecular weight of the aromatic vinyl-based block copolymer (a-1) is less than 30,000, the heat resistance of the layer formed from the thermoplastic polymer composition is decreased, and if the number average molecular weight is more than 200,000, the co-extrusion molding processability of the thermoplastic polymer composition becomes insufficient.

The aromatic vinyl-based block copolymer (a-1) may have one kind or two or more kinds of functional groups such as a carboxyl group, a hydroxyl group, an acid anhydride group, an amino group and an epoxy group in the molecular chain and/or at the molecular ends, as long as the purpose and the effects of the invention are not impaired. Furthermore, as the aromatic vinyl-based block copolymer (a-1), an aromatic vinyl-based block copolymer (a-1) having the functional groups described above and an aromatic vinyl-based block copolymer (a-1) that does not have functional groups may be used as a mixture.

Regarding the fluidity of the aromatic vinyl-based block copolymer (a-1), from the viewpoint of enhancing the co-extrusion molding processability of the thermoplastic polymer composition of the invention, the melt flow rate measured at 230° C. under a load of 2.16 kg is preferably 0.1 g/10 min to 80 g/10 min, and more preferably 5 g/10 min to 50 g/10 min.

(Method for Producing Aromatic Vinyl-Based Block Copolymer (a-1))

The aromatic vinyl-based block copolymer (a-1) can be produced by a known method. As a specific method, a method of producing a block copolymer in which the aromatic vinyl-based monomer is α-methylstyrene, which is considered preferable, and the polymer block G contains a conjugated diene monomer as a main component, according to a known anionic polymerization method, will be described below.

(1) A method of polymerizing a conjugated diene monomer in a tetrahydrofuran solvent using a dianion-based initiator such as 1,4-dilithio-1,1,4,4-tetraphenylbutane, subsequently performing a stepwise polymerization of the product with an α-methylstyrene monomer in order under the conditions of −78° C., and thus obtaining a triblock copolymer represented by F-G-F (see Macromolecules, Vol. 2, pp. 453-458 (1969)).

(2) A method of polymerizing α-methylstyrene in a non-polar solvent such as cyclohexane using an anionic polymerization-based initiator such as sec-butyllithium, subsequently polymerizing the product with a conjugated diene, subsequently performing a coupling reaction by adding a coupling agent such as tetrachlorosilane or diphenyldichlorosilane (α,α'-dichloro-p-xylene, phenyl benzoate or the like can also be used), and thus obtaining a (F-G)nX type block copolymer (see Kautsch. Gummi, Kunstst., Vol. 37, pp. 377-379 (1984); Polym. Bull., Vol. 12, pp. 71-77 (1984)).

(3) A method of polymerizing α-methylstyrene at a concentration of 5% by mass to 50% by mass in a non-polar solvent in the presence of a polar compound at a concentration of 0.1% by mass to 10% by mass at a temperature of −30° C. to 30° C. using an organolithium compound as an initiator, polymerizing the living polymer thus obtained with a conjugated diene, subsequently adding a coupling agent thereto, and thereby obtaining a F-G-F type block copolymer.

(4) A method of polymerizing α-methylstyrene at a concentration of 5% by mass to 50% by mass in a non-polar solvent in the presence of a polar compound at a concentration of 0.1% by mass to 10% by mass at a temperature of −30° C. to 30° C. using an organolithium compound as an initiator, polymerizing the living polymer thus obtained with a conjugated diene, polymerizing the living polymer of a block copolymer composed of an α-methylstyrene polymer block and a conjugated diene polymer block thus obtained, with an anionically polymerizable monomer other than α-methylstyrene, and thereby obtaining a F-G-H type block copolymer.

Among the production methods described above, methods (3) and (4) are preferred, and method (3) is more preferred. In the following description, the methods described above will be specifically explained.

Examples of the organolithium compound used as an initiator include monolithium compounds such as n-butyllithium, sec-butyllithium and tert-butyllithium; and dilithium compounds such as tetraethylenedilithium. These may be used singly, or two or more kinds thereof may be used in combination.

The solvent used at the time of polymerization of α-methylstyrene is a non-polar solvent, and examples thereof include aliphatic hydrocarbons such as cyclohexane, methylcyclohexane, n-hexane and n-heptane; and aromatic hydrocarbons such as benzene, toluene and xylene. These non-polar solvents may be used singly or in combination of two or more kinds thereof.

The polar compound used at the time of polymerization of α-methylstyrene is a compound having a heteroatom such as an oxygen atom or a nitrogen atom in the molecule, which does not have a functional group that reacts with an anion species (a hydroxyl group, a carbonyl group or the like), and examples thereof include diethyl ether, tetramethylethylenediamine, 1,2-dimethoxyethane, and tetrahydrofuran. These polar compounds may be used singly or in combination of two or more kinds thereof.

The concentration of the polar compound in the reaction system is preferably 0.1% by mass to 10% by mass, and more preferably 0.5% by mass to 4% by mass, from the viewpoint of polymerizing α-methylenestyrene at a high conversion ratio, and controlling the amount of 1,4-bonds of the conjugated diene polymer block part when the conjugated diene monomer is polymerized afterwards.

The concentration of α-methylstyrene in the reaction system is preferably 5% by mass to 50% by mass, and more preferably 25% by mass to 40% by mass, from the viewpoint of polymerizing α-methylstyrene at a high conversion ratio, and from the viewpoint of the viscosity of the reaction solution in the later stage of polymerization. Meanwhile, the conversion ratio described above means the ratio at which unpolymerized α-methylstyrene is converted to a block copolymer as a result of polymerization, and the degree of the conversion ratio according to the present invention is preferably 70% or more, and more preferably 85% or more.

The temperature conditions employed at the time of polymerization of α-methylstyrene is preferably −30° C. to 30° C., more preferably −20° C. to 10° C., and even more preferably −15° C. to 0° C., from the viewpoints of the ceiling temperature (temperature at which the polymerization reaction reaches an equilibrium state and does not substantially proceed) of α-methylstyrene, the polymerization rate of α-methylstyrene, the living characteristics, and the like. When the polymerization temperature is set to 30° C. or lower, α-methylstyrene can be polymerized at a high conversion ratio, and the proportion at which the living polymer thus produced is deactivated is also small, incorporation of homopoly-α-methylstyrene into the block copolymer thus obtainable is suppressed, and the physical properties are not impaired. Also, when the polymerization temperature is set to −30° C. or higher, the reaction solution can be stirred without gaining a high viscosity in the later stage of the polymerization of a-methylstyrene, and the cost required for maintaining a low temperature state does not increase. Therefore, it is also preferable in view of economic efficiency.

In regard to the methods described above, another aromatic vinyl-based monomer may be incorporated at the time of the polymerization of α-methylstyrene, and this monomer may be copolymerized with α-methylstyrene, as long as the characteristics of the α-methylstyrene polymer block are not impaired. Examples of the aromatic vinyl-based monomer include styrene, o-methylstyrene, m-methylstyrene, p-methylstyrene, 2,4-dimethylstyrene, vinylnaphthalene, and vinylanthracene.

Since living poly-α-methylstyryllithium is produced by polymerization of a-methylstyrene using an organolithium compound as an initiator, a conjugated diene monomer is subsequently polymerized with this living poly-α-methylstyryllithium.

The conjugated diene monomer is supplied to the polymerization through addition into the reaction system. The method for adding a conjugated diene monomer into the reaction system is not particularly limited, and the conjugated diene monomer may be directly added to a living poly-α-methylstyryllithium solution, or may be added after being diluted with a solvent.

Regarding the method of adding a conjugated diene monomer after diluting the monomer with a solvent, the reaction system may be diluted with a solvent after the conjugated diene monomer is added thereto, the conjugated diene monomer and a solvent may be simultaneously incorporated, or the conjugated diene monomer may be added after the monomer is diluted with a solvent. Preferably, a method of adding a conjugated diene monomer in an amount corresponding to 1 molar equivalent to 100 molar equivalents, and more preferably 5 molar equivalents to 50 molar equivalents, to the living poly-α-methylstyryllithium, polymerizing the conjugated diene monomer to thereby form a conjugated diene block (hereinafter, this may be referred to as polymer block g1) and modify the living active terminals of the polymer, subsequently diluting the system with a solvent, subsequently incorporating the remaining amount of the conjugated diene monomer, performing a polymerization reaction at a temperature above 30° C., and preferably at a temperature in the range of 40° C. to 80° C., and further forming a conjugated diene block (hereinafter, this may be referred to as polymer block g2), is recommended.

Meanwhile, on the occasion of modifying the active terminals of the living poly-α-methylstyryllithium, an aromatic vinyl-based monomer such as styrene, o-methylstyrene, m-methylstyrene, p-methylstyrene, 2,4-dimethylstyrene, vinylnaphthalene, vinylanthracene, or 1,1-diphenylethylene may also be used instead of the conjugated diene monomer.

Here, examples of the solvent that can be used for dilution include aliphatic hydrocarbons such as cyclohexane, methylcyclohexane, n-hexane, and n-heptane; and aromatic hydrocarbons such as benzene, toluene, and xylene. These solvents may be used singly or in combination of two or more kinds thereof.

When the living polymer of a block copolymer composed of an α-methylstyrene polymer block and a conjugated diene polymer block obtained by copolymerizing a conjugated diene monomer with the living poly-α-methylstyryllithium is reacted with, for example, a polyfunctional coupling agent, a triblock- or radial teleblock-type aromatic vinyl-based block copolymer (a-1) can be produced.

The block copolymer in this case may be a mixture including diblock-, triblock- and radial teleblock-type block copolymers, which are obtainable by adjusting the amount of the polyfunctional coupling agent used, at arbitrary proportions.

Examples of the polyfunctional coupling agent include phenyl benzoate, methyl benzoate, ethyl benzoate, ethyl acetate, methyl acetate, methyl pyvalate, phenyl pyvalate, ethyl pyvalate, α,α'-dichloro-o-xylene, α,α'-dichloro-m-xylene, α,α'-dichloro-p-xylene, bis(chloromethyl)ether, dibromomethane, diiodomethane, dimethyl phthalate, dichlorodimethylsilane, dichlorodiphenylsilane, trichloromethylsilane, tetrachlorosilane, and divinylbenzene. Meanwhile, the amount of the polyfunctional coupling agent used may be appropriately adjusted according to the weight average molecular weight of the block copolymer (a), and there are no limitations in a strict sense.

In a case in which the aromatic vinyl-based block copolymer (a-1) composed of an α-methylstyrene polymer block and a conjugated diene polymer block is hydrogenated, a hydrogenated aromatic vinyl-based block copolymer (a-1) can be obtained by polymerizing the living poly-α-methylstyryllithium with the conjugated diene monomer, subsequently terminating the polymerization reaction by adding an active hydrogen compound such as an alcohol, a carboxylic acid or water, and hydrogenating the reaction product in an inert organic solvent in the presence of a hydrogenation catalyst according to the known method described below.

Furthermore, in a case in which the triblock- or radial teleblock-type aromatic vinyl-based block copolymer (a-1) obtainable by reacting a living polymer of a block copolymer composed of an α-methylstyrene polymer block and a conjugated diene polymer block with a polyfunctional coupling agent is hydrogenated, a hydrogenated aromatic vinyl-based block copolymer (a-1) can be obtained by terminating the coupling reaction by optionally adding an active hydrogen compound such as an alcohol, a carboxylic acid, or water, and subsequently hydrogenating the reaction product in an inert organic solvent in the presence of a hydrogenation catalyst according to the known method described below.

An unhydrogenated block copolymer composed of an α-methylstyrene polymer block and a conjugated diene polymer block, or an unhydrogenated triblock- or radial teleblock type block copolymer obtainable by reacting a living polymer of a block copolymer composed of an α-methylstyrene polymer block and a conjugated diene polymer block with a polyfunctional coupling agent (both are included in the aromatic vinyl-based block copolymer (a-1) used for the present invention), can be directly supplied to hydrogenation without replacing the solvent used for the production thereof.

The hydrogenation reaction can be carried out in the presence of a hydrogenation catalyst under the conditions of a reaction temperature of 20° C. to 100° C. and a hydrogen pressure of 0.1 MPa to 10 MPa.

Examples of the hydrogenation catalyst include Raney nickel; heterogeneous catalysts having a metal such as Pt, Pd, Ru, Rh or Ni supported on a carrier such as carbon, alumina or diatomaceous earth; Ziegler catalysts composed of combinations of a transition metal compound (nickel octate, nickel naphthenate, nickel acetylacetonate, cobalt octate, cobalt naphthenate, cobalt acetylacetonate or the like) and an organoaluminum compound such as triethylaluminum or triisobutylaluminum, or an organolithium compound; and metallocene catalysts composed of combinations of a bis(cyclopentadienyl) compound of a transition metal such as titanium, zirconium or hafnium and an organometallic compound of lithium, sodium, potassium, aluminum, zinc, magnesium or the like. It is preferable that the unhydrogenated aromatic vinyl-based block copolymer (a-1) is hydrogenated until 70 mol % or more, and particularly preferably 90 mol % or more, of carbon-carbon double bonds in the polymer block G is saturated, and thereby the weather resistance of the aromatic vinyl-based block copolymer (a-1) can be increased.

Regarding the aromatic vinyl-based block copolymer (a-1) used for the invention, a block copolymer obtained by the above-described method is preferably used. Particularly, a block copolymer obtained by polymerizing α-methylstyrene at a concentration of 5% by mass to 50% by mass in a non-polar solvent in the presence of a polar compound at a concentration of 0.1% by mass to 10% by mass at a temperature of −30° C. to 30° C. using an organolithium compound as an initiator; subsequently adding first a conjugated diene monomer in an amount of 1 molar equivalent to 100 molar equivalents to a living poly-α-methylstyryllithium on the occasion of the polymerization of the conjugated diene monomer; thereby polymerizing the conjugated diene monomer while modifying the living active terminals to form a polymer block g1; subsequently further adding the conjugated diene monomer to the reaction system at a temperature above 30° C. to polymerize the conjugated diene monomer; and thereby forming a polymer block g2, is preferred from the viewpoint that the low temperature characteristics of the block copolymer are excellent. That is, in this case, the polymer block G is composed of the polymer block g1 and the polymer block g2.

The number average molecular weight of the polymer block F in the aromatic vinyl-based block copolymer (a-1) is preferably 1,000 to 50,000, and more preferably 2,000 to 40,000. Furthermore, the number average molecular weight of the polymer block g1 in the aromatic vinyl-based block copolymer (a-1) is preferably 1,000 to 30,000, and more preferably 2,000 to 25,000, while the amount of 1,4-bonds of the structural unit derived from a conjugated diene monomer, which constitutes the polymer block g1, is preferably less than 30%.

Furthermore, the number average molecular weight of the polymer block g2 in the aromatic vinyl-based block copolymer (a-1) is preferably 25,000 to 190,000, and more preferably 30,000 to 100,000, while the amount of 1,4-bonds of the structural unit derived from a conjugated diene monomer, which constitutes the polymer block g2, is preferably 30% or more, more preferably 35% to 95%, and even more preferably 40% to 80%.

Meanwhile, it is preferable that the aromatic vinyl-based block copolymer (a-1) contains at least one (F-g1-g2) structure.

Furthermore, in a case in which the polymer block G of the aromatic vinyl-based block copolymer (a-1) contains a structural unit derived from an isobutylene monomer as a main component, the polymer block G is obtained by conventional cationic living polymerization using 1,4-di(2-methoxy-2-propyl)benzene, 1,4-di(2-chloro-2-propyl)benzene or the like.

For example, a poly($\alpha$-methylstyrene)-polyisobutylene-poly($\alpha$-methylstyrene) triblock copolymer can be produced by cationically polymerizing isobutylene in a hydrocarbon solvent such as hexane or methylcyclohexane, or in a halogenated hydrocarbon solvent such as methyl chloride or methylene chloride under the temperature conditions of $-10°$ C. to $-90°$ C. using an initiator produced by combining 1,4-di(2-methoxy-2-propyl)benzene or 1,4-di(2-chloro-2-propyl)benzene with a Lewis acid such as titanium tetrachloride, and by further adding pyridine, 2,6-di-t-butylpyridine or the like as necessary, thereby obtaining a living polymer, and subsequently cationically polymerizing $\alpha$-methylstyrene.

The aromatic vinyl-based block copolymer (a-1) obtained as described above can be obtained by solidifying the polymerization reaction liquid into methanol or the like, and then heating the mixture or drying the mixture under reduced pressure, or by subjecting the polymerization reaction liquid to so-called steam stripping, by which the polymerization reaction liquid is poured into boiling water, and removing the solvent by azeotropically boiling the solvent, and then heating the residue or drying the residue under reduced pressure.

[Acrylic Polymer (a-2)]

The acrylic polymer (a-2) is an acrylic polymer composed mainly of a structural unit derived from a methacrylic acid ester monomer, and does not contain a structural unit derived from an olefin-based monomer. The term "mainly" as used herein means that a structural unit derived from a (meth) acrylic acid ester monomer is included in the acrylic polymer (a-2) at a proportion of preferably 70% by mass or more, more preferably 75% by mass or more, and even more preferably 80% by mass or more.

From the viewpoint of the compatibility between the aromatic vinyl-based block copolymer (a-1) and the olefin-based polymer containing polar groups (a-3), which are constituent components of the thermoplastic polymer composition of the invention, and from the viewpoint of enhancing the adhesiveness between the layer formed from the thermoplastic polymer composition of the invention and the layer containing an acrylic pressure-sensitive adhesive, the acrylic polymer is a homopolymer of a methacrylic acid ester, or a copolymer obtained by copolymerizing a methacrylic acid ester as a main component with another monomer (except for an olefin-based monomer).

Examples of the methacrylic acid ester include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, and 2-methoxyethyl methacrylate. Among them, from the viewpoint of the co-extrusion molding processability and the like of the thermoplastic polymer composition of the invention, the methacrylic acid ester is preferably a methacrylic acid alkyl ester such as methyl methacrylate, ethyl methacrylate, isopropyl methacrylate, n-butyl methacrylate, tert-butyl methacrylate, cyclohexyl methacrylate, or isobornyl methacrylate; and more preferably methyl methacrylate. These may be used singly or in combination of two or more kinds thereof.

In a case in which the acrylic polymer (a-2) is a copolymer containing a methacrylic acid ester unit as a main component, the other monomer (except for an olefin-based monomer) that can be copolymerized with the methacrylic acid ester that constitutes the copolymer is not particularly limited; however, examples thereof include acrylic acid esters such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate; unsaturated carboxylic acids such as methacrylic acid, acrylic acid, anhydrous maleic acid; aromatic vinyl compounds such as styrene, $\alpha$-methylstyrene, p-methylstyrene, and m-methylstyrene; vinyl acetate, vinylpyridine, acrylonitrile, methacrylonitrile, vinyl ketone, vinyl chloride, vinylidene chloride, vinylidene fluoride, acrylamide, and methacrylamide. These may be used singly or in combination of two or more kinds thereof.

In regard to the copolymer obtained by copolymerizing a methacrylic acid ester and another monomer (except for an olefin-based monomer), the proportion of the other monomer (except for an olefin-based monomer) is preferably a proportion which does not significantly change the properties of the acrylic polymer (a-2), and specifically, the proportion is preferably 30% by mass or less, more preferably 25% by mass or less, and even more preferably 20% by mass or less.

Furthermore, as long as the purpose and the effects of the invention are not impaired, the methacrylic acid ester monomer that constitutes the acrylic polymer (a-2) may include, for example, a polymerizable monomer having a reactive group, such as glycidyl methacrylate or allyl methacrylate, as a constituent component in an amount of preferably 40% by mass or less, and more preferably 20% by mass or less.

When the acrylic polymer (a-2) is a copolymer, the mode of the copolymerization is not particularly limited, and random copolymerization, block copolymerization, alternating copolymerization, and the like are generally used. In regard to the thermoplastic polymer composition of the invention and a laminate formed therefrom, when a block copolymer, preferably a binary block copolymer, composed of a methacrylic acid ester polymer block and an acrylic acid ester polymer block is used as the acrylic polymer (a-2), a thermoplastic polymer composition having excellent co-extrusion molding processability and a laminate formed therefrom can be obtained.

Furthermore, there are no particular limitations on the stereoregularity of the acrylic polymer (a-2), and an isotactic polymer, a heterotactic polymer or a syndiotactic polymer can be used.

The weight average molecular weight of the acrylic polymer (a-2) is not particularly limited; however, the weight average molecular weight is preferably 50,000 to 1,000,000, and more preferably 80,000 to 500,000. Also, the acrylic polymer (a-2) used for the invention may be used singly, or two or more kinds thereof may be used in combination. Meanwhile, the "weight average molecular weights" described in the present specification and the claims are all weight average molecular weights determined by a gel permeation chromatography (GPC) analysis and calculated relative to polystyrene standards.

The melt flow rate of the acrylic polymer (a-2) at 230° C. under a load of 3.8 kg is preferably 0.5 g/10 min to 40 g/10 min, more preferably 1 g/10 min to 40 g/10 min, even more preferably 5 g/10 min to 30 g/10 min, and particularly preferably 10 g/10 min to 25 g/10 min, from the viewpoint of enhancing the co-extrusion molding processability of the thermoplastic polymer composition of the invention.

The acrylic polymer (a-2) can be produced by a general polymerization technique such as solution polymerization, emulsion polymerization or suspension polymerization, and there are no particular limitations on the production method. Furthermore, according to the invention, any product that is industrially produced and is commercially available can be used as the acrylic polymer (a-2) without any particular limitations. Examples thereof include ACRYPET (registered trademark) series manufactured by Mitsubishi Rayon Co., Ltd.; DELPET (registered trademark) series manufactured by Asahi Kasei Chemicals Corp.; SUMIPEX (registered trademark) series manufactured by Sumitomo Chemical Co., Ltd.; and PARAPET (registered trademark) series manufactured by Kuraray Co., Ltd.

[Olefin-Based Polymer Containing Polar Groups (a-3)]

The thermoplastic polymer composition of the invention needs to contain a predetermined amount of an olefin-based polymer containing polar groups (a-3). Examples of the polar groups include an acid anhydride group derived from maleic anhydride, succinic anhydride, fumaric anhydride or the like; a carboxyl group or a carboxylic acid salt group derived from acrylic acid, methacrylic acid or the like; an ester group derived from an acrylic acid ester, a methacrylic acid ester or the like; an acyloxy group derived from vinyl acetate or the like; a silyl group; a hydroxyl group; and a glycidyl group.

Examples of the olefin-based polymer containing polar groups (a-3) include a copolymer of an olefin and a monomer containing a polar group, such as an acid anhydride such as maleic anhydride, succinic anhydride or fumaric anhydride; a carboxylic acid such as acrylic acid or methacrylic acid, or a metal salt thereof (examples of the metal: Na); a (meth)acrylic acid ester such as methyl acrylate, methyl methacrylate, ethyl acrylate, ethyl methacrylate, propyl acrylate, propyl methacrylate, butyl acrylate, butyl methacrylate, or glycidyl methacrylate; or vinyl acetate; and a modified olefin-based polymer obtained by addition polymerization or graft polymerization of an olefin-based polymer with a silyl group-containing compound such as vinylsilane, maleic anhydride, maleic acid, or glycidyl methacrylate.

Examples of the copolymer of an olefin and a monomer containing a polar group include an ethylene-methyl acrylate copolymer (EMA resin), an ethylene-ethyl acrylate copolymer, an ethylene-n-propyl acrylate copolymer, an ethylene-isopropyl acrylate copolymer, an ethylene-n-butyl acrylate copolymer, an ethylene-t-butyl acrylate copolymer, an ethylene-isobutyl acrylate copolymer, an ethylene-acrylic acid copolymer and metal salts thereof, an ethylene-methyl methacrylate copolymer, an ethylene-methyl methacrylate copolymer, an ethylene-n-propyl methacrylate copolymer, an ethylene-isopropyl methacrylate copolymer, an ethylene-n-butyl methacrylate, an ethylene-t-butyl methacrylate copolymer, an ethylene-isobutyl methacrylate copolymer, an ethylene-methacrylic acid copolymer (EMAA resin) and metal salts thereof, an ethylene-maleic anhydride copolymer, an ethylene-butenemaleic anhydride copolymer, an ethylene-propylene-maleic anhydride copolymer, an ethylene-hexene-maleic anhydride copolymer, an ethylene-octene-maleic anhydride copolymer, a propylene-maleic anhydride copolymer, an ethylene-vinyl acetate copolymer (EVA resin), an ethylene-glycidyl methacrylate copolymer, an ethylene-vinyl acetate-glycidyl methacrylate copolymer, and an ethylene-methyl acrylate-glycidyl methacrylate copolymer. These may be used singly or in combination of two or more kinds thereof.

The modified olefin-based polymer is obtained by, for example, melting an olefin-based polymer in the presence of a radical initiator or the like, adding maleic anhydride, maleic acid, glycidyl methacrylate, or a silyl group-containing compound such as vinylsilane thereto, and allowing the compounds to react.

Examples of the modified olefin-based polymer include maleic anhydride modification products or vinylsilane modification products of polypropylene (PP), polyethylene (PE), an ethylene-ethyl acrylate copolymer, a polystyrene-polybutadiene-polystyrene block copolymer (SBS), a polystyrene-polyisoprene-polystyrene block copolymer (SIS), a polystyrene-poly(ethylene/butylene)-polystyrene block copolymer (SEBS), a polystyrene-poly(ethylene/propylene)-polystyrene block copolymer (SEPS), and an ethylene-ethyl acrylate copolymer; a graft copolymer of a polyolefin-vinyl-based polymer; and a copolymer obtained by graft copolymerizing glycidyl methacrylate to an ethylene-propylene rubber. These may be used singly or in combination of two or more kinds thereof.

From the viewpoints of the compatibility with the acrylic polymer (a-2), which is a constituent component of the thermoplastic polymer composition, and of handleability, an ethylene-vinyl acetate copolymer (EVA resin), an ethylene-(meth)acrylic acid ester copolymer, an ethylene-methacrylic acid copolymer (EMAA resin), and a maleic anhydride-modified olefin polymer are preferred, and from the viewpoint of cost, an ethylene-vinyl acetate copolymer (EVA resin) and an ethylene-(meth)acrylic acid ester copolymer (particularly, an ethylene-methyl acrylate copolymer (EMA resin)) are more preferred. From the viewpoint of heat resistance, the content of the structural unit having a polar group in the olefin-based polymer containing polar groups is preferably 5% by mass to 50% by mass, more preferably 5% by mass to 35% by mass, and even more preferably 10% by mass to 30% by mass.

It is preferable that the olefin that constitutes the olefin-based polymer containing polar groups (a-3) includes ethylene or propylene as a main component, from the viewpoint of cost.

For the olefin-based polymer containing polar groups (a-3), commercially available products can also be used, and examples thereof include an ethylene-methyl acrylate copolymer (EMA resin), an ethylene-ethyl acrylate copolymer (EEA resin), an ethylene-butyl acrylate copolymer (EBA resin) and an ethylene methacrylic acid copolymer (EMMA resin) manufactured by DuPont-Mitsui Polychemicals Co., Ltd.; and an ethylene-vinyl acetate copolymer (EVA resin) manufactured by Tosoh Corp.

[Softening Agent (a-4)]

The thermoplastic polymer composition of the invention may further include a softening agent (a-4). Examples of the softening agent (a-4) include known softening agents, including paraffinic, naphthenic and aromatic hydrocarbon-based oils; plant oils such as peanut oil and rosin; phosphoric acid esters; low molecular weight polyethylene glycol; liquid paraffin; and hydrocarbon-based synthetic oils such as low molecular weight polyethylene, an ethylene-α-olefin copolymerized oligomer, liquid polybutene, liquid polyisoprene or a hydrogenation product thereof, and liquid polybutadiene or a hydrogenation product thereof. These may be used singly or in combination of two or more kinds thereof. Among them, paraffinic hydrocarbon-based oils and hydrocarbon-based synthetic oils such as an ethylene-α-olefin copolymerized oligomer are preferably used.

From the viewpoint of molding processability, the dynamic viscosity at 40° C. of the softening agent (a-4) is preferably 50 mm$^2$/s to 1,000 mm$^2$/s, more preferably 50 mm$^2$/s to 800 mm$^2$/s, and even more preferably 80 mm$^2$/s to 600 mm$^2$/s.

[Contents of Various Components]

The thermoplastic polymer composition of the invention includes, as described above, the aromatic vinyl-based block copolymer (a-1), the acrylic polymer (a-2), the olefin-based polymer containing polar groups (a-3) and the softening agent (a-4) at proportions that satisfy the following Expressions (1) to (3):

$$0.05 \leq W_{(a-2)}/W_{(a-1)} \leq 9 \quad (1)$$

$$0.1 < W_{(a-3)}/(W_{(a-1)}+W_{(a-2)}+W_{(a-3)}+W_{(a-4)}) \leq 0.9 \quad (2)$$

$$0 \leq W_{(a-4)}/(W_{(a-1)}+W_{(a-2)}+W_{(a-3)}+W_{(a-4)}) \leq 0.5 \quad (3)$$

wherein $W_{(a-1)}$, $W_{(a-2)}$, $W_{(a-3)}$ and $W_{(a-4)}$ represent the contents (on a mass basis) of the aromatic vinyl-based block copolymer (a-1), the acrylic polymer (a-2), the olefin-based polymer containing polar groups (a-3), and the softening agent (a-4), respectively, in the thermoplastic polymer composition.

In regard to Expression (1), if the value of "$W_{(a-2)}/W_{(a-1)}$", that is, the ratio (mass ratio) of the content of the acrylic polymer (a-2) to the content of the aromatic vinyl-based block copolymer (a-1), is less than 0.05, the strength of adhesion to the acrylic pressure-sensitive adhesive that will be described below becomes insufficient, and if the value is more than 9, the strength of adhesion to the polyolefin-based polymer that will be described below becomes insufficient. From a similar viewpoint, the value of "$W_{(a-2)}/W_{(a-1)}$" is preferably 0.1 to 5, and more preferably 0.6 to 2.

Furthermore, in regard to Expression (2), if the value of "$W_{(a-3)}/(W_{(a-1)}+W_{(a-2)}+W_{(a-3)}+W_{(a-4)})$" is 0.1 or less, the co-extrusion molding processability is decreased to a large extent, and if the value is more than 0.9, the strength of adhesion to the acrylic pressure-sensitive adhesive becomes insufficient. From a similar viewpoint, the value of "$W_{(a-3)}/(W_{(a-1)}+W_{(a-2)}+W_{(a-3)}+W_{(a-4)})$" is preferably 0.15 to 0.7, more preferably 0.2 to 0.6, and even more preferably 0.2 to 0.55.

Furthermore, in regard to Expression (3), the lower limit of "$W_{(a-4)}/(W_{(a-1)}+W_{(a-2)}+W_{(a-3)}+W_{(a-4)})$" is 0, and the softening agent (a-4) may not be included; however, from the viewpoint of molding processability, the thermoplastic polymer composition may include the softening agent (a-4). However, if the value is more than 0.5, the co-extrusion processability is decreased, the delamination resistance is decreased, and the mechanical characteristics may become insufficient. From a similar viewpoint, the value of "$W_{(a-4)}/(W_{(a-1)}+W_{(a-2)}+W_{(a-3)}+W_{(a-4)})$" is preferably 0.3 or less, and more preferably 0.1 or less. From the viewpoint of exhibiting the effect of the softening agent (a-4), the lower limit is preferably 0.01, and more preferably 0.02.

It is preferable that the thermoplastic polymer composition of the invention includes the aromatic vinyl-based block copolymer (a-1), the acrylic polymer (a-2), the olefin-based polymer containing polar groups (a-3), and the softening agent (a-4) in a total amount of 60% by mass or more, and more preferably, the thermoplastic polymer composition is a thermoplastic polymer composition including the components in a total amount of 80% by mass or more, even more preferably in a total amount of 90% by mass or more, and particularly preferably in an amount of substantially 100% by mass. As long as the effects of the invention are not impaired, the thermoplastic polymer composition may include another polymer or the like as necessary, in addition to the aromatic vinyl-based block copolymer (a-1), the acrylic polymer (a-2), the olefin-based polymer containing polar groups (a-3) and the softening agent (a-4).

Examples of the another polymer include polyethylenes such as medium-density polyethylene and low-density polyethylene; polypropylenes such as atactic polypropylene, isotactic polypropylene, and syndiotactic polypropylene; ethylene-α-olefin copolymers such as an ethylene-1-butene copolymer, an ethylene-1-hexene copolymer, an ethylene-1-heptene copolymer, an ethylene-1-octene copolymer, a poly-4-methyl-1-pentene copolymer, an ethylene-1-nonene copolymer, and an ethylene-1-decene copolymer; olefin-based polymers such as an ethylene-propylene random copolymer and polynorbonene; styrene-based resins such as polystyrene, poly(a-methylstyrene), high-impact polystyrene, an AS resin, an ABS resin, an AES resin, an AAS resin, an ACS resin, and a MBS resin; a methyl methacrylate-styrene copolymer; polyester resins such as polyethylene terephthalate, polybutylene terephthalate, and polylactic acid; polyamide resins such as nylon 6, nylon 66, and a polyamide elastomer; polyurethane resins such as an ester-based polyurethane elastomer, an ether-based polyurethane elastomer, a non-yellowing ester-based polyurethane elastomer, a non-yellowing ether-based polyurethane elastomer, and a non-yellowing carbonate-based polyurethane elastomer; polycarbonate, polyvinyl chloride, polyvinylidene chloride, polyvinyl alcohol, polyacetal, polyvinylidene fluoride, a modified polyphenylene ether, polyphenylene sulfide, a silicone rubber-modified polymer. These may be used singly or in combination of two or more kinds thereof. Among these, from the viewpoint of compatibility, polyethylene, polypropylene, a methyl methacrylate-styrene copolymer and a polyurethane polymer are preferred, and polypropylene and a methyl methacrylate-styrene copolymer are more preferred.

In a case in which the other polymer is included, the content of the polymer is preferably 40% by mass or less, and more preferably 20% by mass or less, relative to the total amount of the thermoplastic polymer composition.

Furthermore, the thermoplastic polymer composition of the invention may include components other than the above-described components to the extent that the effects of the invention are not impaired. Examples of such other components include inorganic fillers such as talc, clay, mica, calcium silicate, glass, hollow glass spheres, glass fiber, calcium carbonate, magnesium carbonate, basic magnesium carbonate, aluminum hydroxide, magnesium hydroxide, calcium hydroxide, zinc borate, dawsonite, poly(ammonium phosphate), calcium aluminate, hydrotalcite, silica, diatomaceous earth, alumina, titanium oxide, iron oxide, zinc oxide, magnesium oxide, tin oxide, antimony oxide, barium ferrite, strontium ferrite, carbon black, graphite, carbon fiber, activated carbon, hollow carbon spheres, calcium titanate, lead titanate zirconate, silicon carbide, and mica; organic fillers such as wood powder and starch; and organic pigments. Furthermore, the thermoplastic polymer composition may further include a thermal stabilizer, a photostabilizer, an ultraviolet absorber, an oxidation inhibitor, a lubricating agent, a colorant, an antistatic agent, a flame retardant, a foaming agent, a water-repellant, a waterproofing agent, a tackifying resin, a conductive agent, a thermal conductive agent, an electromagnetic wave shielding agent, a fluorescent agent, an anti-blocking agent, and an antibacterial agent as necessary. Among these components, it is practically preferable to add a thermal stabilizer, an oxidation inhibitor and the like in order to further improve durability.

In a case in which the thermoplastic polymer composition includes those other components, there are no particular limitations on the contents thereof as long as the effects of the invention are not noticeably impaired; however, usually, the content of each of the components is preferably 30 parts by mass or less, more preferably 20 parts by mass or less, and even more preferably 10 parts by mass or less, relative to 100 parts by mass of the total amount of the components (a-1) to (a-4).

(Method for Producing Thermoplastic Polymer Composition)

The method for producing the thermoplastic polymer composition of the invention is not particularly limited; however, in order to increase the dispersibility of the various components that constitute the thermoplastic polymer composition, a method of mixing the composition by melt kneading is preferred. Regarding the production method, for example, a method of simultaneously melt kneading the aromatic vinyl-based block copolymer (a-1), the acrylic polymer (a-2), the olefin-based polymer containing polar groups (a-3) and the softening agent (a-4) may be used, and according to necessity, the other polymer described above and other components may be simultaneously melt kneaded with those components.

The kneading operation can be implemented using an existing mixing or kneading apparatus such as a Kneader-uder, an extruder, a mixing roll, or a Banbury mixer. Particularly, from the viewpoint of enhancing the kneadability and compatibility of the aromatic vinyl-based block copolymer (a-1), acrylic polymer (a-2), olefin-based polymer containing polar groups (a-3) and softening agent (a-4), it is preferable to use a twin-screw extruder. The temperature at the time of mixing and kneading may be appropriately regulated according to the melting temperatures of the aromatic vinyl-based block copolymer (a-1), acrylic polymer (a-2), olefin-based polymer containing polar groups (a-3) and softening agent (a-4) used, and it is usually desirable to mix the components at a temperature of 110° C. to 300° C. In this manner, the thermoplastic polymer composition of the invention may be obtained in an arbitrary form such as pellets and powders. A thermoplastic polymer composition in the form of pellets or a powder is suitable to be used as a molding material.

For the thermoplastic polymer composition of the invention, the ratio between the shear viscosity ηEa (Pa·s) at a shear velocity 1 (1/s) measured at 210° C. and the shear viscosity ηEb (Pa·s) at a shear velocity 100 (1/s) measured at 210° C. (ηEa/ηEb) is preferably 10 or less, and more preferably 7 or less. When such characteristics are satisfied, the co-extrusion molding processability is improved. If the ratio ηEa/ηEb" is larger than 10, the shear velocity dependency of the shear viscosity of the thermoplastic polymer composition increases, and during the production of a laminate by co-extrusion molding processing, the balance in the moldability of the various layers may be easily disturbed by even slight changes in the conditions. Thus, it tends to be difficult to produce a homogeneous laminate having satisfactory delamination resistance with high industrial productivity. Meanwhile, the method for measuring ηEa and ηEb follows the method disclosed in Examples.

[Laminate]

The laminate of the invention is a laminate including a layer formed from the thermoplastic polymer composition of the invention (A), a pressure-sensitive adhesive layer (B) containing an acrylic pressure-sensitive adhesive, and a substrate layer (C) containing a polyolefin-based polymer, in which these layers are laminated in the order of (B)-(A)-(C). The laminate has delamination resistance even if the laminate is produced by co-extrusion molding processing. Since the laminate of the invention is not easily delaminated, the pressure-sensitive adhesive layer (B) of the surface layer can sufficiently exhibit pressure-sensitive adhesive characteristics. Furthermore, since less sticking occurs when the laminate is processed into a roll form, the laminate can be produced with high industrial productivity by co-extrusion molding processing.

Here, Japanese Patent No. 3887341 suggests, for the purpose of improving scratch resistance, abrasion resistance and flexibility, that a layer formed from a polymer composition including a block copolymer (a) having a polymer block containing a structural unit derived from α-methylstyrene as a main component and a polymer block containing a structural unit derived from a conjugated diene monomer or an isobutylene monomer as a main component, an acrylic resin (b) and a softening agent (c) at particular proportions, is provided as an outermost layer. Paragraph [0051] of the publication discloses that various polyolefin-based resins such as polypropylene, an ethylene-propylene random copolymer and an ethylene-vinyl acetate copolymer may be incorporated into the outermost layer, and it is described that the content of the polyolefin-based resins is preferably 10% by mass or less. However, there is no description on an Example of actually incorporating an ethylene-vinyl acetate copolymer. Furthermore, after all, the invention has been developed as a material for an outermost layer, and thus it is not clear whether the material can also function as a material for an adhesive layer between a pressure-sensitive adhesive layer and a substrate layer. The inventors of the present invention conducted a thorough investigation, and as a result, it has been found that when a polymer composition including an olefin-based polymer containing polar groups, which is represented by an ethylene-vinyl acetate copolymer or the like, in an amount of 10% by mass or less is employed as the adhesive layer, there occurs a problem that surging occurs when the polymer composition is subjected to co-extrusion molding processing, the surface smoothness of the pressure-sensitive adhesive layer or the substrate layer is deteriorated, and the thickness of the laminate changes when the laminate is withdrawn into a roll form (see Examples described below).

[Pressure-Sensitive Adhesive Layer (B)]

The pressure-sensitive adhesive layer (B) of the laminate of the invention contains an acrylic pressure-sensitive adhesive, and the acrylic pressure-sensitive adhesive is preferably an acrylic pressure-sensitive adhesive containing an acrylic block copolymer (b-1) which has at least one polymer block (I-1) composed of a methacrylic acid ester unit (hereinafter, may be simply referred to as polymer block (I-1)) and at least one polymer block (I-2) composed of an acrylic acid ester unit (hereinafter, may be simply referred to as polymer block (I-2)). The content of the acrylic block copolymer (b-1) in the acrylic pressure-sensitive adhesive is preferably 50% by mass or more, more preferably 70% by mass or more, even more preferably 80% by mass or more, still more preferably 90% by mass or more, and particularly preferably substantially 100% by mass.

Meanwhile, the acrylic pressure-sensitive adhesive may contain an acrylic polymer other than the acrylic block copolymer (b-1). Examples of the acrylic polymer other than the acrylic block copolymer (b-1) include a (meth)acrylic acid ester homopolymer such as polymethyl methacrylate, a random copolymer of (meth)acrylic acid esters, an ethylene-acrylic acid ester copolymer, an ethylene-methacrylic acid copolymer (EMAA resin), an AS resin, an ABS resin, an AES resin, an AAS resin, an ACS resin, a MBS resin, and a styrene-methyl methacrylate copolymer. However, the examples are not particularly limited to these, and a polymer obtained by using (meth)acrylic acid or a (meth)acrylic acid ester as at least one of the components of the raw material, is included.

The weight average molecular weight (Mw) of the acrylic block copolymer (b-1) is usually preferably 30,000 to 300,000, and more preferably 45,000 to 150,000. When the Mw of the acrylic block copolymer (b-1) is 30,000 or more, the melt viscosity of the acrylic block copolymer (b-1) does not become extremely small, satisfactory withdrawability into a roll form is obtained, and co-extrusion molding processing is achieved easily. When the Mw of the acrylic block copolymer (b-1) is 300,000 or less, the melt viscosity of the acrylic block copolymer (b-1) does not become extremely large, and there is less risk of roughening of the surface of a molded product obtainable by co-extrusion molding processing. Furthermore, in the case of performing co-extrusion molding processing by a T-die method, expansion at the two edges occurs insufficiently, and a satisfactory laminate may not be obtained. Also, from the viewpoint of the pressure-sensitive characteristics such as an increase in the cohesive force of the pressure-sensitive adhesive layer (B) formed from the acrylic pressure-sensitive adhesive, the ratio between the Mw and the number average molecular weight (Mn) of the acrylic block copolymer (b-1) (Mw/Mn) is preferably 1.0 to 2.0, more preferably 1.0 to 1.8, even more preferably 1.0 to 1.5, and particularly preferably 1.0 to 1.3.

Examples of the methacrylic acid ester as a constituent unit of the polymer block (I-1) include methacrylic acid esters that do not have functional groups, such as methyl methacrylate, ethyl methacrylate, isopropyl methacrylate, n-propyl methacrylate, n-butyl methacrylate, isobutyl methacrylate, sec-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, phenyl methacrylate, and benzyl methacrylate; and methacrylic acid esters that have functional groups, such as methoxyethyl methacrylate, ethoxyethyl methacrylate, diethylaminoethyl methacrylate, 2-hydroxyethyl methacrylate, 2-aminoethyl methacrylate, glycidyl methacrylate, and tetrahydrofurfuryl methacrylate.

Among these, from the viewpoint of enhancing the transparency, heat resistance and durability of the acrylic pressure-sensitive adhesive, methacrylic acid esters that do not have functional groups are preferred, and methyl methacrylate, ethyl methacrylate, tert-butyl methacrylate, cyclohexyl methacrylate, isobornyl methacrylate, and phenyl methacrylate are more preferred, and methyl methacrylate is even more preferred. The polymer block (I-1) may be composed of one kind of these methacrylic acid esters, or may be composed of two or more kinds thereof.

It is also preferable that the acrylic block copolymer (b-1) contains two or more polymer blocks (I-1), from the viewpoint of increasing durability. In that case, those polymer blocks (I-1) may be identical or different.

The weight average molecular weight (Mw) of the polymer block (I-1) is not particularly limited; however, usually, the weight average molecular weight is preferably 1,000 to 50,000, and more preferably 4,000 to 20,000. When the weight average molecular weight (Mw) of the polymer block (I-1) is 1,000 or more, there is less risk that the cohesive force of the acrylic block copolymer (b-1) thus obtainable or the cohesive force of the acrylic pressure-sensitive adhesive containing the acrylic block copolymer (b-1) may be insufficient. Furthermore, when the weight average molecular weight (Mw) of the polymer block (I-1) is 50,000 or less, the melt viscosity of the acrylic pressure-sensitive adhesive thus obtainable does not excessively increase, and the productivity or co-extrusion molding processability of the acrylic block copolymer (b-1) is improved. The proportion of the methacrylic acid ester unit included in the polymer block (I-1) is preferably 60% by mass or more, more preferably 80% by mass or more, and even more preferably 90% by mass or more, of the polymer block (I-1).

The content of the polymer block (I-1) in the acrylic block copolymer (b-1) is preferably 5% by mass to 50% by mass. From the viewpoint of excellent pressure-sensitive adhesion performance, and from the viewpoint that the acrylic block copolymer (b-1) or the acrylic pressure-sensitive adhesive containing the acrylic block copolymer (b-1) can be supplied in a form that can be easily handled (for example, pellet form), the content of the polymer block (I-1) is preferably 10% by mass to 45% by mass, and more preferably 15% by mass to 40% by mass.

Examples of the acrylic acid ester unit that constitutes the polymer block (I-2) include acrylic acid esters that do not have functional groups, such as n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, n-octyl acrylate, isooctyl acrylate, decyl acrylate, isobornyl acrylate, lauryl acrylate, phenyl acrylate, and benzyl acrylate; acrylic acid esters that have functional groups, such as methoxyethyl acrylate, ethoxyethyl acrylate, diethylaminoethyl acrylate, 2-hydroxyethyl acrylate, 2-aminoethyl acrylate, glycidyl acrylate, tetrahydrofurfuryl acrylate, and phenoxyethyl acrylate. Among these, from the viewpoint of enhancing the transparency, flexibility, cold resistance and low temperature characteristics of the acrylic pressure-sensitive adhesive containing the acrylic block copolymer (b-1) thus obtainable, acrylic acid esters that do not have functional groups are preferred. These may be used singly or in combination of two or more kinds thereof.

In a case in which two or more kinds of acrylic acid esters that constitute the polymer block (I-2) are used in combination, from the viewpoint of enhancing the transparency, flexibility, cold resistance and low temperature characteristics of the acrylic pressure-sensitive adhesive containing the acrylic block copolymer (b-1) thus obtainable, and enhancing the co-extrusion molding processability, it is preferable to use an acrylic acid ester (i-1) represented by formula: $CH_2=CH-COOR^1$ (P) (wherein $R^1$ represents an organic group having 4 to 6 carbon atoms) (hereinafter, simply referred to as acrylic acid ester (i-1)) and an acrylic acid ester (i-2) represented by formula: $CH_2=CH-COOR^2$ (Q) (wherein $R^2$ represents an organic group having 7 to 12 carbon atoms) (hereinafter, simply referred to as acrylic acid ester (i-2)) in combination.

Examples of the acrylic acid ester (i-1) include acrylic acid esters that do not have functional groups, such as n-butyl acrylate, isobutyl acrylate, sec-butyl acrylate, tert-butyl acrylate, amyl acrylate, isoamyl acrylate, n-hexyl acrylate, cyclohexyl acrylate, and phenyl acrylate; and acrylic acid esters that have functional groups, such as methoxyethyl acrylate, ethoxyethyl acrylate, diethylaminoethyl acrylate, 2-hydroxyethyl acrylate, 2-aminoethyl acrylate, glycidyl acrylate, and tetrahydrofurfuryl acrylate. Among them, acrylic acid esters such as n-butyl acrylate and n-hexyl acrylate are more preferred. These may be used singly or in combination of two or more kinds thereof.

Examples of the acrylic acid ester (i-2) include 2-ethylhexyl acrylate, n-octyl acrylate, isooctyl acrylate, decyl acrylate, isobornyl acrylate, lauryl acrylate, benzyl acrylate, and phenoxyethyl acrylate. Among them, from the viewpoint of enhancing the transparency, flexibility, cold resistance and low temperature characteristics of the acrylic block copolymer (b-1) thus obtainable or of the acrylic pressure-sensitive adhesive containing the acrylic block copolymer (b-1), acrylic acid esters such as 2-ethylhexyl acrylate, n-octyl acrylate, isooctyl acrylate, lauryl acrylate, and phenoxyethyl acrylate are preferred. Furthermore, from the viewpoint that the acrylic pressure-sensitive adhesive has excellent pressure-sensitive adhesive characteristics (tackiness, adhesive force and the like) at a low temperature ($-40°$ C. to $10°$ C.) and exhibits stable adhesive force under the conditions of a wide range of peeling rate, 2-ethylhexyl acrylate, n-octyl acrylate and isooctyl acrylate are more preferred. These may be used singly or in combination of two or more kinds thereof.

The mass ratio, (i-1)/(i-2), between the acrylic acid ester (i-1) and the acrylic acid ester (i-2) in the polymer block (I-2) is preferably such that the mass ratio (i-1)/(i-2) is preferably 90/10 to 10/90, and more preferably 60/40 to 40/60, from the viewpoint of imparting excellent pressure-sensitive adhesive characteristics and enhancing the compatibility with a tackifying resin. Meanwhile, the mass ratio between the acrylic acid ester (i-1) and the acrylic acid ester (i-2) can be determined by the method described in the following Examples.

When two or more kinds of the acrylic acid esters that constitute the polymer block (I-2) are used in combination, examples of the combination of the acrylic acid esters include n-butyl acrylate/2-ethylhexyl acrylate, n-butyl acrylate/octyl acrylate, n-hexyl acrylate/2-ethylhexyl acrylate, n-butyl acrylate/lauryl acrylate, n-butyl acrylate/benzyl acrylate, and n-butyl acrylate/[2-ethylhexyl acrylate/lauryl acrylate]. At this time, it is more preferable that the difference between the solubility parameters of the acrylic acid ester (i-1) and the acrylic acid ester (i-2) used is 1.0 $(MPa)^{1/2}$ to 2.5 $(MPa)^{1/2}$.

Meanwhile, the solubility parameter can be calculated by the methods described in "POLYMER HANDBOOK, Fourth Edition", VII, pp. 675-714 (Wiley Interscience Publication, published in 1999) and "Polymer Engineering and Science", 1974, Vol. 14, pp. 147-154.

Furthermore, in a case in which the acrylic block copolymer (b-1) contains two or more polymer blocks (I-2), the combination of the acrylic acid ester units that constitute those polymer blocks (I-2) may be identical or different.

The structure of the polymer block (I-2) may be, for example, a random copolymer of the acrylic acid ester (i-1) and the acrylic acid ester (i-2), may be a block copolymer, or may be a tapered block copolymer. In a case in which the acrylic block copolymer (b-1) contains two or more polymer blocks (I-2), the structures of those polymer blocks (I-2) may be identical or different. The proportion of the acrylic acid ester units included in the polymer block (I-2) is preferably 60% by mass or more, more preferably 80% by mass or more, and even more preferably 90% by mass or more, of the polymer block (I-2).

The polymer block (I-1) and the polymer block (I-2) may contain the components of each other to the extent that the effects of the invention are not impaired. In a case in which the polymer blocks contain the components of each other, the form may be a random structure, or may have a gradient structure (tapered structure) in which the copolymerization ratio of the polymer block (I-1) and the polymer block (I-2) gradually changes at one or two or more boundaries. Furthermore, if necessary, the polymer blocks may also contain other monomers. Examples of the other monomers include vinyl compounds having carboxyl groups, such as (meth) acrylic acid, crotonic acid, maleic acid, maleic anhydride, and fumaric acid; vinyl-based monomers having functional groups, such as (meth)acrylamide, (meth)acrylonitrile, vinyl acetate, vinyl chloride, and vinylidene chloride; aromatic vinyl compounds such as styrene, α-methylstyrene, p-methylstyrene, and m-methylstyrene; conjugated diene compounds such as butadiene and isoprene; olefin compounds such as ethylene, propylene, isobutene, and octene; and lactone-based monomers such as c-caprolactone and valerolactone. When the polymer blocks contain these, the content thereof is usually an amount of preferably 40% by mass or less, and more preferably 20% by mass or less, relative to the total mass of the monomers used in each of the polymer blocks.

The acrylic block copolymer (b-1) may have another polymer block if necessary, in addition to the polymer block (I-1) and the polymer block (I-2) described above. Examples of such other polymer block include polymer blocks or copolymer blocks composed of styrene, α-methylstyrene, p-methylstyrene, m-methylstyrene, acrylonitrile, methacrylonitrile, ethylene, propylene, isobutene, butadiene, isoprene, octene, vinyl acetate, maleic anhydride, vinyl chloride, and vinylidene chloride; and polymer blocks composed of polyethylene terephthalate, polylactic acid, polyurethane, and polydimethylsiloxane. Furthermore, the polymer block described above also includes a hydrogenation product of a polymer block containing a conjugated diene compound such as butadiene or isoprene.

The method for producing the acrylic block copolymer (b-1) is not particularly limited as long as a polymer which satisfies the conditions of the invention in connection with the chemical structure is obtained, and any method equivalent to a known technology can be employed. Generally, regarding a method for obtaining a block copolymer having a narrow molecular weight distribution, a method of subjecting a monomer which is a constituent unit to living polymerization is employed. Examples of such a technique of living polymerization include a method of performing living polymerization using an organic rare earth metal complex as a polymerization initiator (see JP-A-6-093060); a method of performing living anionic polymerization in the presence of a mineral salt such as a salt of an alkali metal or an alkaline earth metal, using an organic alkali metal compound as a polymerization initiator (see JP-T-5-507737); a method of performing living anionic polymerization in the presence of an organoaluminum compound, using an organic alkali metal compound as a polymerization initiator (see JP-A-11-335432); and an atom transfer radical polymerization (ATRP) (see Macromolecular Chemistry and Physics, 2000, Vol. 201, pp. 1108-1114).

Among the production methods described above, the method for producing an acrylic block copolymer (b-1) by performing living anionic polymerization in the presence of an organoaluminum compound using an organic alkali metal compound as a polymerization initiator, is preferable because the acrylic block copolymer (b-1) thus obtainable has high transparency, the amount of remaining monomers is small, any odor is suppressed, and also the generation of air bubbles in the pressure-sensitive adhesive layer (B) can be suppressed when the polymer composition is used as an acrylic pressure-sensitive adhesive. Furthermore, it is also preferable from the viewpoint that the molecular structure of the polymer block (I-1) becomes highly syndiotactic, and there is an effect of increasing heat resistance of the acrylic pressure-sensitive adhesive, and from the viewpoint that living polymerization is enabled under relatively mild temperature conditions, and when the acrylic block copolymer is industrially produced, there is less environmental load (electric power mainly applied to a refrigerating machine for controlling the polymerization temperature).

Regarding the organoaluminum compound, for example, an organoaluminum compound represented by the following Formula (R):

$$AlR^3R^4R^5 \quad (R)$$

wherein $R^3$, $R^4$ and $R^5$ each independently represent an alkyl group which may have a substituent, a cycloalkyl group which may have a substituent, an aryl group which may have a substituent, an aralkyl group which may have a substituent, an alkoxy group which may have a substituent, an aryloxy group which may have a substituent, or a N,N-disubstituted amino group, or $R^3$ represents any one of the groups described above, while $R^4$ and $R^5$ are bonded together and form an arylenedioxy group which may have a substituent.

Preferred examples of the organoaluminum compound represented by Formula (R) include isobutylbis(2,6-di-tert-butyl-4-methylphenoxy)aluminum, isobutylbis(2,6-di-tert-butylphenoxy)aluminum, and isobutyl [2,2'-methylenebis(4-methyl-6-tert-butylphenoxy)]aluminum, from the viewpoint that the living characteristics of polymerization is high, and handling is easy.

Examples of the organic alkali metal compound include alkyllithiums and alkyldilithiums such as n-butyllithium, sec-butyllithium, isobutyllithium, tert-butyllithium, n-pentyllithium, and tetramethylenedilithium; aryllithiums and aryldilithiums such as phenyllithium, p-tolyllithium, and lithium naphthalene; aralkyllithiums and aralkyldilithiums such as benzyllithium, diphenylmethyllithium, and a dilithium produced by a reaction between diisopropenyl benzene and butyllithium; lithium amides such as lithium dimethylamide; and lithium alkoxides such as methoxylithium and ethoxylithium. These may be used singly or in combination of two or more kinds thereof. Among them, alkyllithiums are preferred from the viewpoint of having high polymerization initiation efficiency, and among them, tert-butyllithium and sec-butyllithium are more preferred, and sec-butyllithium is even more preferred.

Furthermore, the living anionic polymerization is usually carried out in the presence of a solvent that is inert to the polymerization reaction. Examples of the solvent include aromatic hydrocarbons such as benzene, toluene and xylene; halogenated hydrocarbons such as chloroform, methylene chloride and carbon tetrachloride; and ethers such as tetrahydrofuran and diethyl ether.

The acrylic block copolymer (b-1) can be produced by, for example, repeating a process of forming desired polymer blocks (polymer block (I-1), polymer block (I-2) and the like) at desired ling polymer terminals obtained by polymerizing a monomer, for a desired number of times, and then terminating the polymerization reaction. Specifically, for example, the acrylic block copolymer (b-1) can be produced by obtaining a polymer through plural stages of polymerization processes including a first step of polymerizing a monomer that forms a first polymer block in the presence of an organoaluminum compound using a polymerization initiator composed of an organic alkali metal compound; a second step of polymerizing a monomer that forms a second polymer block; and optionally a third step of polymerizing a monomer that forms a third polymer block, reacting the active terminals of the polymer thus obtained with an alcohol or the like, and thereby terminating the polymerization reaction. According to a method such as described above, a binary block (diblock) copolymer composed of polymer block (I-1)-polymer block (I-2), a tertiary block (triblock) copolymer composed of polymer block (I-1)-polymer block (I-2)-polymer block (I-1), a quaternary block copolymer composed of polymer block (I-1)-polymer block (I-2)-polymer block (I-1)-polymer block (I-2), and the like can be produced.

The polymerization temperature employed at the time of performing living anionic polymerization is preferably 0° C. to 100° C. when the polymer block (I-1) is formed, and preferably −50° C. to 50° C. when the polymer block (I-2) is formed. If the polymerization temperature is lower than the above-mentioned range, the progress of the reaction tends to be slow. On the other hand, if the polymerization temperature is higher than the above-mentioned range, deactivation of the living polymer terminals is increased, and there are occasions in which the molecular weight distribution becomes wide, or a desired block copolymer may not be obtained.

The acrylic pressure-sensitive adhesive may further include one kind or two or more kinds of additives such as a tackifying resin, a softening agent, a plasticizer, a thermal stabilizer, a photostabilizer, an antistatic agent, a flame retardant, a foaming agent, a colorant, a dyeing agent, a refractive index adjusting agent, a filler, and a curing agent, to the extent that the effects of the invention are not impaired.

Examples of the tackifying resin include rosins such as gum rosin, tall oil rosin, and wood rosin; modified rosins such as hydrogenated rosin, disproportionated rosin, and polymerized rosin; rosin-based resins, such as rosin esters such as glycerin esters and pentaerythritol esters of these rosins and modified rosins; terpene-based resins such as terpene resins containing α-pinene, β-pinene and dipentene as main components, aromatically modified terpene resins, hydrogenated terpene resins, and terpene phenol resins; (hydrogenated) petroleum resins such as (hydrogenated) aliphatic (C5-based) petroleum resins, (hydrogenated) aromatic (C9-based) petroleum resins, (hydrogenated) copolymer based (C5/C9-based) petroleum resins, (hydrogenated) dicyclopentadiene-based petroleum resins, and alicyclic saturated hydrocarbon resins; styrene-based polymers such as poly-α-methylstyrene, an α-methylstyrene/styrene copolymer, a styrene-based monomer/aliphatic monomer copolymer, a styrene-based monomer/α-methylstyrene/aliphatic monomer copolymer, a styrene-based monomer copolymer, and a styrene-based monomer/aromatic monomer copolymer; and synthetic resins such as a coumarone-indene-based resin, a phenolic resin, and a xylene-based resin. Among the tackifying resins, rosin-based resins, terpene-based resins, (hydrogenated) petroleum resins and styrene-based resins are preferred from the viewpoint of exhibiting high adhesive force. Above all, rosins are preferred from the viewpoint of increasing the adhesiveness, and disproportionated or hydrogenated rosins that have been purified by operations such as distillation, recrystallization and extraction are more preferred, from the viewpoint of resistance to photodeterioration or from the viewpoint of suppressing coloration and the generation of gas bubbles caused by impurities. These may be used singly or in combination of two or more kinds thereof. Also, the softening point of the tackifying resin is preferably 50° C. to 150° C. from the viewpoint of exhibiting high adhesive force.

Furthermore, in the case of incorporating a tackifying resin, the content of the tackifying resin is preferably 1 part to 100 parts by mass, more preferably 3 parts to 70 parts by mass, even more preferably 5 parts to 50 parts by mass, particularly preferably 5 parts to 40 parts by mass, and most preferably 5 parts to 35 parts by mass, relative to 100 parts by mass of the acrylic block copolymer (b-1), from the viewpoints of adhesive force and durability.

Regarding the rosin-based resins, commercially available products such as "PINE CRYSTAL (registered trademark) KE-100", "PINE CRYSTAL (registered trademark) KE-311", "PINE CRYSTAL (registered trademark) KE-359", "PINE CRYSTAL (registered trademark) KE-604", and "PINE CRYSTAL (registered trademark) D-6250" (all manufactured by Arakawa Chemical Industries, Ltd.) can be used. Regarding the terpene-based resins, commercially available products such as "TAMANOL (registered trademark) 901" (manufactured by Arakawa Chemical Industries, Ltd.) can be used. Regarding the styrene-based resins, commercially available products such as FTR6000 series and FTR7000 series (manufactured by Mitsui Chemicals, Inc.) can be used.

Examples of the softening agent or plasticizer include aliphatic acid esters, including phthalic acid esters such as dibutyl phthalate, di-n-octyl phthalate, bis-2-ethylhexyl phthalate, di-n-decyl phthalate, and diisodecyl phthalate, adipic acid esters such as bis-2-ethylhexyl adipate and di-n-octyl adipate, sebacic acid esters such as bis-2-ethylhexyl sebacate and di-n-butyl sebacate, and azelaic acid esters such as bis-2-ethylhexyl azelate; paraffins such as chlorinated paraffin; glycols such as polypropylene glycol; epoxy-based polymeric plasticizers such as epoxidized soybean oil and epoxidized linseed oil; phosphoric acid esters such as trioctyl phosphate and triphenyl phosphate; phosphorous acid esters such as triphenyl phosphite; acrylic oligomers such as poly(n-butyl (meth)acrylate) and poly(2-ethylhexyl (meth)acrylate); polybutene; polyisobutylene; polyisoprene; process oils; and naphthene-based oils. These may be used singly or in combination of two or more kinds thereof.

Examples of the filler include inorganic fibers such as glass fiber and carbon fiber; organic fibers; and inorganic fillers such as calcium carbonate, talc, carbon black, titanium oxide, silica, clay, barium sulfate, and magnesium carbonate.

Examples of the curing agent include photocuring agents such as a UV-curing agent, and thermal curing agents, and specific examples thereof include benzoins such as benzoin, α-methylolbenzoin, and α-t-butylbenzoin; benzoin ethers such as benzoin methyl ether, benzoin ethyl ether, benzoin n-propyl ether, benzoin isopropyl ether, benzoin isobutyl ether, α-methylolbenzoin methyl ether, α-methoxybenzoin methyl ether, and benzoin phenyl ether; benzophenone; anthraquinones such as 9,10-anthraquinone and 2-ethyl-9,10-anthraquinone; benzil; acetophenones such as 2,2-dimethoxy-1,2-diphenylethan-1-one (2,2-dimethoxy-2-phenylacetophenone); and diacetyl. These curing agents may be used singly or in combination of two or more kinds thereof. When a curing agent is incorporated, the pressure-sensitive adhesive can be suitably used as a curable pressure-sensitive adhesive such as a UV-curable hot melt pressure-sensitive adhesive.

The pressure-sensitive adhesive layer (B) contains the acrylic pressure-sensitive adhesive in an amount of preferably 50% by mass or more, more preferably 70% by mass or more, even more preferably 80% by mass or more, still more preferably 90% by mass or more, and particularly preferably substantially 100% by mass. Meanwhile, the pressure-sensitive adhesive layer (B) may further contain another polymer in addition to the acrylic pressure-sensitive agent.

Examples of the other polymer include olefin-based polymers such as polyethylene, an ethylene-vinyl acetate copolymer (EVA resin), maleic anhydride-modified polyethylene, polypropylene, maleic anhydride-modified polypropylene, polybutene-1, poly-4-methylpentene-1, and polynorbonene; ethylene-based ionomers; styrene-based resins such as polystyrene, a styrene-maleic anhydride copolymer, and high-impact polystyrene; polyester resins such as polyethylene terephthalate and polybutylene terephthalate; polyamides such as nylon 6, nylon 66, and a polyamide elastomer; polycarbonate; polyvinyl chloride; polyvinylidene chloride; polyvinyl alcohol; an ethylene-vinyl alcohol copolymer; polyacetal; polyvinylidene fluoride; polyurethane; modified polyphenylene ethers; polyphenylene sulfide; silicone rubber-modified polymers; acrylic rubbers; silicone-based rubbers; and olefin-based rubbers such as isoprene rubber (IR), ethylene-propylene rubber (EPR), and ethylene-propylene-diene rubber (EPDM).

The method for producing an acrylic pressure-sensitive adhesive is not particularly limited, and for example, an acrylic pressure-sensitive adhesive can be produced by mixing the various components usually at 100° C. to 250° C. using an existing mixing or kneading apparatus such as a Kneaderuder, an extruder, a mixing roll or a Banbury mixer. The acrylic pressure-sensitive adhesive thus obtained can be utilized for the formation of the pressure-sensitive adhesive layer (B) by heating and melting the acrylic pressure-sensitive adhesive.

In regard to the acrylic pressure-sensitive adhesive included in the pressure-sensitive adhesive layer (B), the ratio $\eta Ex/\eta Ey$) between the shear viscosity $\eta Ex$ (Pa·s) at a shear velocity 1 (1/s) measured at 210° C. and the shear viscosity $\eta Ey$ (Pa·s) at a shear velocity 100 (1/s) measured at 210° C. is preferably 25 or less, more preferably 15 or less, and even more preferably 10 or less. When such characteristics are satisfied, a laminate having a smaller thickness variation can be obtained. If the ratio ηEx/ηEy exceeds 25, the shear velocity dependency increases, and during the production of a laminate by co-extrusion molding processing, the balance in the moldability of the various layers may be easily disturbed by even slight changes in the conditions. Thus, it becomes difficult to obtain a satisfactory laminate. Meanwhile, the method for measuring the shear viscosity follows the method disclosed in the Examples that will be described below.

Furthermore, from the viewpoint of the co-extrusion molding processability, the absolute value of the difference between the value of ηEa/ηEb of the thermoplastic polymer composition and the value of ηEx/ηEy of the acrylic pressure-sensitive adhesive is preferably 10 or less, and more preferably 8 or less.

[Substrate Layer (C)]

The substrate layer (C) contains a polyolefin-based polymer.

Examples of the polyolefin-based polymer include homopolymers or copolymers of olefins; and olefin-based polymers containing polar groups. The polyolefin-based polymer may also be a product obtained by using unsaturated monomers other than olefins [provided that (meth) acrylic acid and (meth)acrylic acid esters are excluded] in combination as raw materials. Furthermore, the monomer unit that constitutes the polymer may have a halogen group, a sulfone group or a silyl group.

More specific examples of the polyolefin-based polymer include polyethylene-based polymers such as polyethylene, an ethylene-butene copolymer, an ethylene-hexene copolymer, an ethylene-octene copolymer, and chlorinated polyethylene; polypropylene-based polymers such as polypropylene, copolymers of ethylene and propylene such as a propylene-ethylene random copolymer, a propylene-ethylene block copolymer and an ethylene-propylene-non-conjugated diene copolymer, and chlorinated polypropylene; and (co)polymers of cyclic olefins, such as poly-1-butene, poly-isobutylene, and polymethylpentene.

The polyolefin-based polymers may be used singly or in combination of two or more kinds thereof.

From the viewpoint of the co-extrusion molding processability, it is preferable that the substrate layer (C) contains a polyolefin-based polymer having a melting point of 90° C. or higher, and it is preferable that the substrate layer (C) contains a polyolefin-based polymer having a melting point of 100° C. or higher. Here, the melting point refers to a peak top temperature of an endothermic curve measured by differential scanning calorimetry (DSC).

The content of the polyolefin-based polymer in the substrate layer (C) is preferably 50% by mass or more, more preferably 70% by mass or more, even more preferably 80% by mass or more, still more preferably 90% by mass or more, and particularly preferably substantially 100 parts by mass.

The polyolefin-based polymer composition may appropriately include various additives such as a photostabilizer, an ultraviolet absorber, a lubricating agent, an oxidation inhibitor and a filler, as necessary. That is, the substrate layer (C) may be in the form of a layer containing a polyolefin-based polymer composition.

Examples of the photostabilizer include phenolic compounds, phosphorus-based compounds, and hindered amine-based compounds. Examples of the ultraviolet absorber include benzotriazole-based compounds, benzophenone-based compounds, and salicylic acid ester-based compounds. Examples of the lubricating agent include erucic acid amide, ethylenebisoleylamide, oleic acid amide, and methylenebisstearic acid amide. Examples of the oxidation inhibitor include hindered phenol-based compounds, phosphorus-based compounds, lactone-based compounds, and hydroxyl-based compounds. Examples of the filler include inorganic fillers such as calcium carbonate, talc, magnesium hydroxide, aluminum hydroxide, mica, clay, natural silicic acid, synthetic silicic acid, titanium oxide, carbon black, barium sulfate, glass balloon, and glass fiber.

The substrate layer (C) containing the polyolefin-based polymer is such that from the viewpoints of the co-extrusion molding processability, and the pressure-sensitive adhesive characteristics and the delamination resistance of the laminate thus obtainable, the tensile modulus at 23° C. and at a tensile rate of 300 mm/min is preferably 300 MPa to 1,800 MPa, and more preferably 800 MPa to 1,500 MPa. When the tensile modulus is 300 MPa or more, the laminate is not easily deformed at the time of being withdrawn by co-extrusion processing, and a satisfactory laminate can be easily obtained. Also, the flexibility of the laminate thus obtained does not increase too much, and satisfactory handleability during the process of bonding to an adherend is obtained. When the tensile modulus is 1,800 MPa or less, defects such as fracture or cracks are not likely to occur in the process of bonding to an adherend or detachment from an adherend, and there is less risk of damaging the adherend.

Here, the tensile modulus of the substrate layer (C) containing the polyolefin-based polymer is a value measured under the conditions of 23° C. and a tensile rate of 300 mm/min, according to the method described in ISO 527-3.

From the viewpoint such as described above, the polyolefin-based polymer is preferably a polyolefin-based polymer having a tensile modulus at 23° C. and a tensile rate of 300 mm/min which satisfies the condition of 300 MPa to 1,800 MPa, and from the viewpoint of the balance between the production cost and the physical properties of the substrate layer (C), a polyethylene-based polymer, a polypropylene-based polymer, or a mixture thereof is preferred. From the viewpoints of heat resistance and handleability, a polypropylene-based polymer is more preferred, and polypropylene is particularly preferred.

(Characteristics of Laminate)

In regard to the laminate of the invention, the 180° peeling strength at a peeling rate of 300 mm/min against an acrylic resin (particularly, PMMA resin) plate, which is measured at room temperature (23° C.) according to ISO 29862, is preferably 0.1 N/25 mm to 25 N/25 mm, more preferably 2 N/25 mm to 15 N/25 mm, and even more preferably 5 N/25 mm to 15 N/25 mm.

For example, in the case of using the laminate of the invention as a protective film, if the peeling strength against an acrylic resin plate (adherend) is small, the laminate is not bonded to the adherend with sufficient strength at the time of the operation of bonding to the acrylic resin plate, and the laminate may be easily detached. If the peeling strength is too large, the peeling operation becomes difficult, and if it is attempted to detach the laminate forcefully, the adherend itself may be deformed.

(Method for Producing Laminate)

There are no particular limitations on the method for producing the laminate of the invention; however, for example, a co-extrusion molding processing method of using a feed block, a multi-manifold die or the like, and using a film-forming apparatus such as a T-die extrusion molding machine or an inflation molding machine, may be preferably used.

The thickness of the laminate of the invention is not particularly limited; however, usually, the thickness is preferably 0.01 mm to 2.0 mm, more preferably 0.02 mm to 0.5 mm, and even more preferably 0.03 mm to 0.2 mm.

For the laminate of the invention, the form in the previous stage, in which the laminate is applied to various applications, is not particularly limited; however, a form in which sheets of the laminate are superimposed, or a form in which the laminate is wound up into a roll form may be employed. In the laminate of the invention, the layers (A) to (C) are laminated in the order of (B)-(A)-(C). Since the adhesive force of the pressure-sensitive adhesive layer (B) to the substrate layer (C) is small, less sticking occurs when the laminate is processed into a roll form, and therefore, the laminate can be stored in the form of being wound into a roll form. A laminate in the form of being wound into a roll form is preferred from the viewpoint that continuous bonding processing is enabled, and productivity is enhanced. If necessary, another layer such as a peeling layer may be further laminated on the surface on the side opposite to the surface of the layer (B) that is brought into contact with the layer (A), or another layer such as a printed layer may be laminated on the surface side that is brought into contact with the layer (A).

[Applications]

The laminate of the invention can be used for various applications. Examples thereof include pressure-sensitive adhesive tapes and films for surface protection, masking, bundling, packaging, office use, labeling, decoration/display, bonding, dicing tapes, sealing, corrosion-proofing/waterproofing, clinical/hygiene, glass scattering prevention, electrical insulation, electronic equipment maintenance and fixing, semiconductor production, optical display films, adhesive optical films, electromagnetic wave shielding, and sealing materials for electric/electronic components. Specific examples will be described below.

Pressure-sensitive adhesive tapes or films for surface protection can be used for a variety of materials such as metals, plastics, rubber and wood, and specifically, those tapes or films can be used for coating surfaces, at the time of plastic working or deep drawing of metals, and surface protection of automotive members and optical members. Examples of the automotive members include coated exterior panels, wheels, mirrors, windows, lights, and light covers. Examples of the optical members include various image display devices such as liquid crystal displays, organic EL displays, plasma displays, and field emission displays; optical disc-constituting films such as polarizing films, polarizing plates, retardation plates, light guiding plates, diffusion plates, and DVDs; and precise fine coating surfaced plates for electronic/optical applications.

Examples of the applications such as pressure-sensitive tapes or films for masking include masking at the time of the production of printed boards or flexible printed boards; masking at the time of plating or solder treatment on electronic equipment; and production of vehicles such as automobiles, coating of vehicles and constructions, textile printing, and masking at the time of abandonment of public works and construction.

Examples of the bundling applications include wire harness, electric wires, cables, fibers, pipes, coils, winding wires, steel materials, ducts, polyethylene bags, food, vegetables, and ornamental flowers.

Examples of the package applications include heavy article packaging, export packaging, sealing of corrugated cardboard boxes, and can sealing.

Examples of the office use include general-purpose office applications, sealing, repair of books, drafting, and memorandum.

Examples of the labeling applications include prices, merchandise displays, tags, POPs, stickers, stripes, name plates, ornaments, and advertisements.

Examples of the adherend for labeling include plastic products such as plastic bottles and foamed plastic cases; paper/corrugated cardboard products such as corrugated paper boxes; glass products such as glass bottles; metal products; and other inorganic material products such as ceramics.

Examples of the decoration/display applications include danger sign seals, line tapes, wiring markings, luminous tapes, and reflective sheets.

Examples of the pressure-sensitive adhesive optical film applications include an optical film forming a pressure-sensitive adhesive layer on at least a portion or the entirety of one surface or both surfaces of a polarizing film, a polarizing plate, a retardation film, a viewing angle expansion film, a luminance improving film, an antireflective film, an anti-glare film, a color filter, a light-guiding plate, a diffusion film, a prism sheet, an electromagnetic wave shielding film, a near-infrared absorption film, a functional composite optical film, an ITO bonding film, an impact resistance imparting film, a luminance increasing film, and a visibility improving film. Such pressure-sensitive optical films include a film formed from the laminate of the invention on a protective film used for the surface protection of the optical films. Pressure-sensitive adhesive optical films are suitably used in various image display devices such as liquid crystal display devices, PDPs, organic EL display devices, electronic papers, gaming machines, and mobile terminals.

Examples of the insulation applications include protective coating or insulation of coils, and interlayer insulation of motors/transformers.

Examples of the applications for electronic equipment maintenance and fixing include carrier tapes, packaging, fixing of cathode ray tubes, splicing, and rib reinforcement.

Examples of the applications for semiconductor production include protection of silicone wafers.

Examples of the bonding applications include various fields of adhesion, an adhesion to automobiles, electric trains, electric equipment, printing plate fixing, construction, name plate fixing, general domestic use, rough surfaces, corrugated surfaces, and curved surfaces.

Examples of the sealing applications include sealing for thermal insulation, vibration-proofing, waterproofing, moisture-proofing, soundproofing, and dust-proofing.

Examples of the corrosion-proofing/waterproofing applications include corrosion-proofing of gas and water pipes, corrosion-proofing of large diameter pipes, and corrosion-proofing of public works/constructions.

Examples of clinical/hygiene applications include transdermal absorption drug applications for analgesic antiinflammatory agents (plasters and PAPs), therapeutic agents for ischemic cardiac diseases, female hormone supplements, bronchodilators, cancer pain relieving agents, stop smoking agents, adhesive patches for common cold, antipururitic patches, and keratin softeners; various tape applications such as first-aid adhesive tapes (including sterilizers), surgical dressings/surgical tapes, adhesive plasters, hemostatic bond, tapes for human excrement treating mounting fixtures (artificial anus fixing tapes), tapes for sutures, antibacterial tapes, fixing tapes, self-adhesive dressings, adhesive tapes for oral mucosa, sports tapes, and depilatory tapes; cosmetic applications such as face packs, eye moisturizing sheets, and keratin peeling packs; cooling sheets, small heat packs, and applications for dust-proofing, waterproofing and pest trapping.

Examples of the applications for sealing materials of electronic/electric components include liquid crystal monitors and solar cells.

EXAMPLES

Hereinafter, the invention will be specifically explained by means of Examples and the like, but the invention is not intended to be limited to these Examples. Meanwhile, the various physical properties in the Examples and Comparative Examples were measured or evaluated by the following methods.

[Methods for Measurement or Evaluation]
<1. Weight Average Molecular Weights (Mw), Number Average Molecular Weights (Mn) and Molecular Weight Distributions (Mw/Mn) of Aromatic Vinyl-Based Block Copolymer (a-1) and Acrylic Block Copolymer (b-1)>

These were determined as molecular weights relative to polystyrene standards by gel permeation chromatography (hereinafter, abbreviated to GPC).

Apparatus: GPC apparatus "HLC-8020" (manufactured by Tosoh Corp.)
Separating columns: "TSKgel GMHXL", "G4000HXL" and "G5000HXL" manufactured by Tosoh Corp. were connected in series.
Eluent: Tetrahydrofuran
Flow rate of eluent: 1.0 ml/min
Column temperature: 40° C.
Detection method: Differential refractive index (RI)

<2. Content of Polymer Block F and Amount of 1,4-Bonds of Polymer Block G in Aromatic Vinyl-Based Block Copolymer (a-1), and Contents of Various Polymer Blocks in Acrylic Block Copolymer (b-1)>

These were determined by a $^1$H-NMR analysis.
Apparatus: Nuclear magnetic resonance apparatus "JNM-ECX400" (manufactured by JEOL, Ltd.)
Solvent: Deuterated chloroform <3. Melting Point>
A sample that had been fused by heating the sample from 30° C. to 250° C. at a rate of temperature increase of 10° C./rain was cooled from 250° C. to 30° C. at a rate of temperature decrease of 10° C./min, and then the sample was heated again from 30° C. to 250° C. at a rate of temperature increase of 10° C./min, using a differential scanning calorimeter (DSC) "TGA/DSC1 Star System" (manufactured by Mettler Toledo International, Inc.). The peak top temperature of an endothermic peak measured during the process was designated as the melting point.

<4. Tensile Modulus of Polyolefin-Based Polymer>
A polyolefin-based polymer was molded into a sheet having a thickness of 1 mm at 200° C. using a press molding machine, and the tensile modulus thereof was measured according to the method described in ISO 527-3 under the conditions of room temperature (23° C.) and a tensile rate of 300 mm/min.

<5. Melt Flow Rate>
The melt flow rate was measured according to ISO 1133 at the temperature and load described in the table.

<6. Shear Viscosity Ratio ($\eta$Ea/$\eta$Eb) of Thermoplastic Polymer Composition>

A sheet having a thickness of 1 mm obtained by molding a thermoplastic polymer composition at 200° C. using a press molding machine was interposed between parallel discs (diameter 25 mm) using a rotary type rheometer "ARES" (manufactured by Rheometric Scientific, Inc.), and the shear viscosity was calculated by designating the value of complex viscosity $\eta^*$ at 210° C. and the shear velocity 1 (1/s), which was measured under the conditions of a strain of 5%, a rate of temperature increase of 5° C./min, and a measurement temperature of 170° C. to 250° C., as shear viscosity $\eta$Ea (Pa·s), and designating the value of complex viscosity $\eta^*$ at 210° C. and the shear velocity 100 (1/s), which was measured under the conditions of 170° C. to 250° C., as shear viscosity $\eta$Eb (Pa·s).

<7. Shear Viscosity Ratio ($\eta$Ex/$\eta$Ey) of Acrylic Pressure-Sensitive Adhesive>

A sheet having a thickness of 1 mm obtained by molding an acrylic pressure-sensitive adhesive at 200° C. using a press molding machine was interposed between parallel discs (diameter 25 mm) using a rotary type rheometer "ARES" (manufactured by Rheometric Scientific, Inc.), and the shear viscosity was calculated by designating the value of complex viscosity $\eta^*$ at 210° C. and the shear velocity 1 (1/s), which was measured under the conditions of a strain of 5%, a rate of temperature increase of 5° C./rain, and a measurement temperature of 170° C. to 250° C., as shear viscosity $\eta$Ex (Pa·s), and designating the value of complex viscosity $\eta^*$ at 210° C. and the shear velocity 100 (1/s), which was measured under the conditions of 170° C. to 250° C., as shear viscosity $\eta$Ey (Pa·s).

<8. Co-Extrusion Molding Processability>
The laminate of the invention was produced using a three-component three-layer feed block type T-die co-extruder by feeding a thermoplastic polymer composition, an acrylic pressure-sensitive adhesive and a polyolefin-based polymer respectively into different T-dies, under the co-extrusion molding processing conditions described below.

Co-Extrusion Molding Processing Conditions:
Layer Configurations and Thicknesses of Various Layers
The laminate was molded such that the thickness ratio of the pressure-sensitive adhesive layer (B) from the acrylic pressure-sensitive adhesive/the layer (A) formed from the thermoplastic polymer composition/the substrate layer (C) formed from the polyolefin-based polymer=10 µm/10 µm to 40 µm.

Specifications of Extruder and Extrusion Temperature
A single-screw extruder was used. The molding temperatures in the respective extruders at the time of extrusion of the various layers were as follows: the layer (A) formed from the thermoplastic polymer composition: 200° C., the pressure-sensitive adhesive layer (B) formed from the acrylic pressure-sensitive adhesive: 190° C., and the substrate layer (C) formed from the polyolefin-based polymer: 210° C.

Specifications of T-Dies, Feed Blocks and Cooling Rolls, Temperature at the Time of Molding, Withdrawal Condition Range
The width of the T-dies was 300 mm, the temperatures of the adaptor (AD) to a junction of a composition of three components (two components), the T-dies, and the three-component three-layer feed block (molding apparatus at the junction) were all set to 200° C. The temperature of the cooling roll for withdrawing a laminate ejected from the T-dies was 40° C., and the withdrawing rate was 4.0 m/min.

Surging (in which the amount of extrusion in the co-extrusion molding processing is not constant, and the shape or dimension of the product becomes irregular or varies regularly) of the laminate thus obtained, the surface smoothness, and the withdrawability at the time of molding were evaluated according to the evaluation criteria described below, and these were taken as indicators of co-extrusion molding processability.

(Surging)

A laminate was divided uniformly into 10 parts in the width direction, and the cross-sections were observed with an optical microscope "Digital Microscope VHX-900" (manufactured by Keyence Corp.). The thickness of each of the layers at the center of each cross-section was measured, and the average value of thicknesses of each the layers (hereinafter, referred to as average thickness) was determined.

Next, for the respective fragments obtained by dividing the laminate, the sites in each layer at which the maximum thickness and the minimum thickness were obtained were selected by checking with a microscope, and those thicknesses were measured. These were respectively taken as the maximum thickness and the minimum thickness of each layer. In the laminate used for the measurement, the coefficient of thickness variation of each layer was calculated by the following formula, using any one of the maximum thickness or the minimum thickness, which gave a larger difference with the average thickness.

$$\text{Coefficient of thickness variation (\%)}=100\times|(\text{average thickness})-(\text{maximum thickness or minimum thickness})|/(\text{average thickness})$$

wherein |(average thickness)−(maximum thickness or minimum thickness)| means the absolute value of the difference between the (average thickness) and the (maximum thickness or minimum thickness).

++: Among the coefficients of thickness variation of the various layers that constitute the laminate, the maximum value is less than 10%.

+: Among the coefficients of thickness variation of the various layers that constitute the laminate, the maximum value is 10% or more but less than 20%.

−: Among the coefficients of thickness variation of the various layers that constitute the laminate, the maximum value is 20% or more.

(Surface Smoothness)

This was determined by visual inspection.

++: When the laminate thus obtained was held up to visible light and was visually observed, there were no surface irregularities, and the surface was smooth.

+: When the laminate thus obtained was held up to visible light and was visually observed, surface irregularities such as melt fractures were observed by visual inspection, and when the laminate was not held up to the light, those surface irregularities were not observed by visual inspection.

−: Even in a case in which the laminate thus obtained was not held up to light, emboss-like surface irregularities or surface irregularities such as streaks in the flow direction were visually observed.

(Withdraw Ability)

For a laminate that had been withdrawn into a roll (1 m/min in the flow direction), the thickness was measured with a thickness meter at every 10 cm from a position 5 cm away from an end in the flow direction of the laminate, respectively at the position 5 cm away from either end in the width direction of the laminate and at the position at the center in the width direction. In the laminate thus analyzed, the coefficient of thickness variation (%) was calculated by the following formula, using any one of the maximum value of thickness (maximum thickness) or the minimum value of thickness (minimum thickness) of each layer, which gave a larger difference with the thickness average value (average thickness) of the measured values.

$$\text{Coefficient of thickness variation (\%)}=100\times|(\text{average thickness})-(\text{maximum thickness or minimum thickness})|/(\text{average thickness})$$

wherein |(average thickness)−(maximum thickness or minimum thickness)| means the absolute value of the difference between the (average thickness) and the (maximum thickness or minimum thickness).

++: The coefficient of thickness variation of the laminate is less than 10%.

+: The coefficient of thickness variation of the laminate is 10% or more but less than 20%.

−: The coefficient of thickness variation of the laminate is 20% or more.

<9. Delamination Resistance of Substrate Layer (C) and Layer (A)>

A laminate produced in the same manner as the method described in the above section 8. except that an acrylic pressure-sensitive adhesive was not used, was cut into a size of a width of 25 mm and a length of 100 mm, and the sample thus obtained was stored for 24 hours at room temperature (23° C.). Subsequently, the delamination resistance was measured by peeling the laminate in the direction of 180° at a rate of 300 mm/min at 23° C. according to ISO 29862 using a measuring instrument "5566 type" (manufactured by Instron Corp.), and the delamination resistance was evaluated according to the following evaluation criteria.

++: more than 16 N/25 mm
+: 5 N/25 mm to 16 N/25 mm
−: less than 5 N/25 mm

<10. Delamination Resistance Between Layer (A) and Pressure-Sensitive Adhesive Layer (B)>

A laminate produced in the same manner as the method described in the above section 8. except that a polyolefin-based polymer was not used, was cut into a size of a width of 25 mm and a length of 100 mm, and the sample thus obtained was stored for 24 hours at room temperature (23° C.). Subsequently, the delamination resistance was measured by peeling the laminate in the direction of 180° at a rate of 300 mm/min at 23° C. according to ISO 29862 using a measuring instrument "5566 type" (manufactured by Instron Corp.), and the delamination resistance was evaluated according to the following evaluation criteria.

++: more than 16 N/25 mm
+: 5 N/25 mm to 16 N/25 mm
−: less than 5 N/25 mm

<11. 180° Peeling Strength of Laminate Against Acrylic Resin Plate>

A laminate produced by the method described above was cut into a size of a width of 25 mm and a length of 100 mm, and was bonded to an acrylic resin (PMMA) plate. The sample was stored for 24 hours at room temperature (23° C.), and then the 180° peeling strength was measured by peeling the laminate in the direction of 180° at a rate of 300 mm/min at 23° C. according to ISO 29862 using a measuring instrument "5566 type" (manufactured by Instron Corp.).

[Raw Material Polymers Used in Examples]

The details of the raw material polymers used in Examples and Comparative Examples are shown below. Furthermore, their physical properties are shown in Tables 1 to 6.

[Aromatic Vinyl-Based Block Copolymer (a-1)]

[Production Example 1] Production of Aromatic Vinyl-Based Bock Copolymer (1)

800 g of cyclohexane, 30 g of styrene and 5.2 ml of sec-butyllithium (1.3 M cyclohexane solution) were introduced into a nitrogen-purged pressure-resistant vessel equipped with a stirring apparatus, and the components were polymerized for 60 minutes at 50° C.

Subsequently, 140 g of isoprene was added to this reaction liquid mixture, and polymerization was carried out for 60 minutes. 30 g of styrene was further added thereto, and polymerization was carried out for 60 minutes. Subsequently, methanol was added at the last to terminate the reaction, and thus a polystyrene-polyisoprene-polystyrene triblock copolymer was synthesized.

Into the polymerization reaction solution obtained as described above, a Ziegler hydrogenation catalyst formed from nickel octate and triethylaluminum was added in a hydrogen atmosphere, and a hydrogenation reaction was carried out for 5 hours at 80° C. at a hydrogen pressure of 0.8 MPa. Thus, a hydrogenation product of a polystyrene-polyisoprene-polystyrene triblock copolymer was obtained.

The hydrogenated block copolymer thus obtained was analyzed by GPC, and as a result, the following was found: peak top molecular weight of the main component (Mt)=59,000, number average molecular weight (Mn)=57,600, weight average molecular weight (Mw)=58,000, Mw/Mn=1.01. Also, a $^1$H-NMR analysis was carried out, and as a result, the content of the polystyrene block in the polystyrene triblock copolymer was 31% by mass, the amount of 1,4-bonds of the polyisoprene block was 93 mol %, and the hydrogenation ratio was 98%.

The melt flow rate at 230° C. under a load of 2.16 kg was 50 g/10 min.

[Production Example 2] Production of Aromatic Vinyl-Based Block Copolymer (2)

90.9 g of α-methylstyrene, 138 g of cyclohexane, 15.2 g of methylcyclohexane, and 3.2 g of tetrahydrofuran were introduced into a nitrogen-purged pressure-resistant vessel equipped with a stirring apparatus. 9.8 ml of sec-butyllithium (1.3 M cyclohexane solution) was added to this liquid mixture, and polymerization was carried out for 3 hours at −10° C. The number average molecular weight (Mn) of poly-α-methylstyrene after 3 hours from the initiation of the polymerization was 6,600, and the polymerization conversion ratio of α-methylstyrene was 89%.

Subsequently, 23 g of butadiene was added to this reaction liquid mixture, polymerization was performed by stirring the reaction liquid mixture for 30 minutes at −10° C., and then 930 g of cyclohexane was added thereto. The polymerization conversion ratio of α-methylstyrene at this time point was 89%, and the number average molecular weight (measured by GPC, and calculated relative to polystyrene standards) of a polybutadiene block (g1) thus formed was 3,700, while the amount of 1,4-bonds determined by a $^1$H-NMR analysis was 19 mol %.

Next, 141.3 g of butadiene was further added to the present reaction liquid, and a polymerization reaction was carried out for 2 hours at 50° C. The number average molecular weight (Mn) of a polybutadiene block (g2) of a block copolymer (structure: F-g1-g2) obtained by sampling at this time point was 29,800, and the amount of 1,4-bonds determined by a $^1$H-NMR analysis was 60 mol %.

Subsequently, 12.2 ml of dichlorodimethylsilane (0.5 M toluene solution) was added to this polymerization reaction solution, and the mixture was stirred for 1 hour at 50° C. Thus, a poly-α-methylstyrene-polybutadiene-poly-α-methylstyrene triblock copolymer was obtained. When the coupling efficiency obtainable at this time was calculated from an area ratio of UV absorption in GPC between a coupled body (poly-α-methylstyrene-polybutadiene-poly-α-methylstyrene triblock copolymer: F-g1-g2-X-g2-g1-F; wherein X represents a coupled residue (—Si(Me)$_2$-); number average molecular weight (Mn)=81,000) and an unreacted block copolymer (poly-α-methylstyrene-polybutadiene block copolymer: F-g1-g2, number average molecular weight (Mn)=41,000), the coupling efficiency was 94% by mass. Furthermore, according to the results of a $^1$H-NMR analysis, the content of a poly-α-methylstyrene block in the poly-α-methylstyrene-polybutadiene-poly-α-methylstyrene triblock copolymer was 30% by mass, and the amount of 1,4-bonds of the entirety of the polybutadiene blocks, that is, the block (g1) and the block (g2), was 60 mol %.

A Ziegler hydrogenation catalyst formed from nickel octate and triethylaluminum was added in a hydrogen atmosphere to the polymerization reaction solution obtained as described above, and a hydrogenation reaction was carried out for 5 hours at 80° C. at a hydrogen pressure of 0.8 MPa. Thus, a hydrogenation product of the poly-α-methylstyrene-polybutadiene-poly-α-methylstyrene triblock copolymer was obtained.

The hydrogenated block copolymer thus obtained was analyzed by GPC, and as a result, a main component thereof was a hydrogenation product (coupled body) of a poly-α-methylstyrene-polybutadiene-poly-α-methylstyrene triblock copolymer with peak top molecular weight (Mt)=81,000, number average molecular weight (Mn)=78,700, weight average molecular weight (Mw)=79,500, and Mw/Mn=1.01. It was found from the area ratio of UV (254 nm) absorption in GPC that the coupled body was included in an amount of 94% by mass. Furthermore, the hydrogenation ratio of the polybutadiene block composed of block (g1) and block (g2) was found by a $^1$H-NMR analysis to be 97 mol %.

The melt flow rate at 230° C. under a load of 2.16 kg was 5.0 g/10 min.

[Production Example 3] Production of Aromatic Vinyl-Based Block Copolymer (3)

90.9 g of α-methylstyrene, 138 g of cyclohexane, 15.2 g of methylcyclohexane, and 5.4 g of tetrahydrofuran were introduced into a nitrogen-purged pressure-resistant vessel equipped with a stirring apparatus. 9.8 ml of sec-butyllithium (1.3 M cyclohexane solution) was added to this liquid mixture, and the mixture was polymerized for 3 hours at −10° C. Thus, a polymer block F was formed. The number average molecular weight (Mn) of the poly-α-methylstyrene (polymer block F) after 3 hours from the initiation of polymerization was 6,600, and the polymerization conversion ratio of α-methylstyrene was 89%.

Subsequently, 23 g of butadiene was added to this reaction liquid mixture, polymerization was performed by stirring the reaction liquid mixture for 30 minutes at −10° C., and then 930 g of cyclohexane was added thereto. The polymerization conversion ratio of α-methylstyrene at this time point was 89%, the number average molecular weight (measured by GPC and calculated relative to polystyrene standards) of the polybutadiene block (g1) thus formed was 3.700, and the amount of 1,4-bonds determined from a $^1$H-NMR analysis was 19 mol %.

Next, 141.3 g of butadiene was further added to this reaction liquid, and a polymerization reaction was carried out for 2 hours at 50° C. The number average molecular weight (Mn) of the polybutadiene block (g2) of the block copolymer (structure: A-g1-g2) obtained by sampling at this time point was 29,800, and the amount of 1,4-bonds determined by a $^1$H-NMR analysis was 47 mol %.

Subsequently, 12.2 ml of dichlorodimethylsilane (0.5 M toluene solution) was added to this polymerization reaction solution, and the mixture was stirred for 1 hour at 50° C. Thus, a poly-α-methylstyrene-polybutadiene-poly-α-methylstyrene triblock copolymer was obtained. When the coupling efficiency obtainable at this time was calculated from the area ratio of UV absorption in GPC between a coupled body (poly-α-methylstyrene-polybutadiene-poly-α-methylstyrene triblock copolymer: F-g1-g2-X-g2-g1-F; wherein X represents a coupled residue (—Si(Me)$_2$-); number average molecular weight (Mn)=81,000) and an unreacted block copolymer (poly-α-methylstyrene-polybutadiene block copolymer: F-g1-g2, number average molecular weight (Mn)=41,000), the coupling efficiency was 94% by mass. Furthermore, according to the results of a $^1$H-NMR analysis, the content of the poly-α-methylstyrene block in the poly-α-methylstyrene-polybutadiene-poly-α-methylstyrene triblock copolymer was 30% by mass, and the amount of 1,4-bonds of the entirety of the polybutadiene blocks (polymer block (B)), that is, block (g1) and block (g2), was 47 mol %.

A Ziegler hydrogenation catalyst formed from nickel octate and triethylaluminum was added in a hydrogen atmosphere to the polymerization reaction solution obtained as described above, and a hydrogenation reaction was carried out for 5 hours at 80° C. at a hydrogen pressure of 0.8 MPa. Thus, a hydrogenation product of the poly-α-methylstyrene-polybutadiene-poly-α-methylstyrene triblock copolymer [hereinafter, this is simply referred to as block copolymer (I)-1] was obtained.

The block copolymer (I)-1 thus obtained was analyzed by GPC, and as a result, a main component thereof was a hydrogenation product (coupled body) of a poly-α-methylstyrene-polybutadiene-poly-α-methylstyrene triblock copolymer with peak top molecular weight (Mt)=81,000, number average molecular weight (Mn)=78,700, weight average molecular weight (Mw)=79,500, and Mw/Mn=1.01. It was found from the area ratio of UV (254 nm) absorption in GPC that the coupled body was included in an amount of 94% by mass. Furthermore, the hydrogenation ratio of the polybutadiene block composed of block (g1) and block (g2) was found by a $^1$H-NMR analysis to be 97 mol %.

The melt flow rate at 230° C. under a load of 2.16 kg was 17 g/10 min.

The details of the aromatic vinyl-based block copolymers (a-1) obtained Production Examples 1 to 3 are summarized in Table 1.

TABLE 1

| | Aromatic vinyl-based block copolymer (a-1) | | |
|---|---|---|---|
| | (1) | (2) | (3) |
| Kind of polymer block F | Polystyrene | Poly(α-methylstyrene) | Poly(α-methylstyrene) |
| Content of the kind of polymer block F (mol %) | 31 | 30 | 30 |
| Kind of polymer block G | Polyisoprene | Polybutadiene | Polybutadiene |
| Hydrogenation ratio of polymer block G (mol %) | 98 | 97 | 97 |
| Amount of 1,4-bonds of polymer block G (mol %) | 93 | 60 | 47 |
| Number average molecular weight (Mn) | 57,600 | 78,700 | 78,700 |
| MFR (230° C., 2.16 kg) (g/10 min) | 50 | 5.0 | 17 |

[Acrylic Polymer (a-2)]

(4) "PARAPET GF" (trade name, methacrylic resin manufactured by Kuraray Co., Ltd.)

(5) "PARAPET G" (trade name, methacrylic resin manufactured by Kuraray co., Ltd.)

The melt flow rates of the above-mentioned acrylic polymers (a-2) are presented in Table 2.

TABLE 2

| | Acrylic polymer (a-2) | |
|---|---|---|
| | (4) | (5) |
| MFR (230° C., 3.8 kg) (g/10 min) | 15 | 8.0 |

[Olefin-Based Polymer Containing Polar Groups (a-3)]

(6) "ULTRACENE #680" (trade name, ethylene-vinyl acetate copolymer (EVA resin) manufactured by Tosoh Corp., content of vinyl acetate in the copolymer: 20% by mass)

(7) "ELVALOYAC 12024S" (trade name, ethylene-methyl acrylate copolymer (EMA resin) manufactured by DuPont-Mitsui Polychemicals Co., Ltd., content of methyl acrylate in the copolymer: 24% by mass)

(8) "NUCREL N1525" (trade name, manufactured by DuPont-Mitsui Polychemicals Co., Ltd., ethylene-methacrylic acid copolymer (EMAA resin), content of methacrylic acid in the copolymer: 15% by mass)

The melt flow rates of the olefin-based polymers containing polar groups (a-3) are presented in Table 3.

TABLE 3

| | Olefin-based polymer containing polar groups (a-3) | | |
|---|---|---|---|
| | (6) | (7) | (8) |
| Kind | EVA resin | EMA resin | EMAA resin |
| MFR (190° C., 2.16 kg) (g/10 min) | 160 | 20 | 25 |

EVA resin: ethylene-vinyl acetate copolymer
EMA resin: ethylene-methyl acrylate copolymer
EMAA resin: ethylene-methacrylic acid copolymer

[Softening Agent (a-4)]

(9) "DIANA PROCESS OIL PW380" (trade name, paraffinic process oil manufactured by Idemitsu Kosan Co., Ltd., dynamic viscosity (40° C.)=386.1 mm$^2$/s)

TABLE 4

| | Softening agent (a-4) (9) |
|---|---|
| Kind | Paraffinic process oil |

[Acrylic Pressure-Sensitive Adhesive: Acrylic Block Copolymer (b-1)] (for Pressure-Sensitive Adhesive Layer)

As the acrylic block copolymer (b-1), a product obtained by performing living anionic polymerization in toluene in the presence of 1,2-dimethoxyethane and isobutylbis(2,6-di-tert-butyl-4-methylphenoxy)aluminum using sec butyllithium as a polymerization initiator, was used.

(10) Acrylic block copolymer

As shown in the following Table 5, a triblock copolymer of methyl methacrylate polymer block (PMMA)-n-butyl acrylate polymer block (PnBA)-methyl methacrylate polymer block (PMMA) having a PMMA content of 20% by mass, a Mw of 81,000, and a molecular weight distribution of 1.15 was used.

(11) Acrylic block copolymer

As shown in the following Table 5, a triblock copolymer of methyl methacrylate polymer block (PMMA)-n-butyl acrylate/2-ethylhexyl acrylate polymer block (P(nBA/2EHA))-methyl methacrylate polymer block (PMMA) having a PMMA content of 20% by mass, a mass ratio of n-butyl acrylate/2-ethylhexyl acrylate of 50/50, a weight average molecular weight of 80,000, and a molecular weight distribution (weight average molecular weight/number average molecular weight) of 1.14 was used.

(12) Acrylic block copolymer

As shown in the following Table 5, a triblock copolymer of methyl methacrylate polymer block (PMMA)-n-butyl acrylate polymer block (PnBA)-methyl methacrylate polymer block (PMMA) having a PMMA content of 20% by mass, a Mw of 160,000, and a molecular weight distribution of 1.18 was used.

The details of the acrylic block copolymers (b-1) are summarized in Table 5.

TABLE 5

| | Acrylic pressure-sensitive adhesive: acrylic block copolymer (b-1) | | |
|---|---|---|---|
| | (10) | (11) | (12) |
| Form | Triblock copolymer | Triblock copolymer | Triblock copolymer |
| Polymer block (I-1): 1st block | PMMA | PMMA | PMMA |
| Polymer block (I-2): 2nd block | PnBA | P(nBA/2EHA) | PnBA |
| Polymer block (I-1): 3rd block | PMMA | PMMA | PMMA |
| Mw | 81,000 | 80,000 | 160,000 |
| Mw/Mn | 1.15 | 1.14 | 1.20 |
| Copolymerized components in block copolymer (mass ratio) | MMA/nBA = 20/80 | MMA/nBA/2EHA = 20/40/40 | MMA/nBA = 20/80 |
| Shear viscosity characteristics ($\eta Ex/\eta Ey$) | 1.6 | 1.3 | 35 |

MMA: methyl methacrylate
nBA: n-butyl acrylate
2EHA: 2-ethylhexyl acrylate

[Polyolefin-Based Polymer] (for Substrate Layer)

(13) "PRIME POLYPRO J715M" (trade name, polypropylene resin manufactured by Prime Polymer Co. Ltd., melting point: 160° C., tensile modulus: 1300 MPa)

(14) "NOVATEC HF560" (trade name, polyethylene resin manufactured by Japan Polyethylene Corp., melting point: 134° C., tensile modulus: 1050 MPa)

(15) "NOVATEC LC600A" (trade name, polyethylene resin manufactured by Japan Polyethylene Corp., melting point: 106° C., tensile modulus: 120 MPa)

TABLE 6

| | Polyolefin-based polymer | | |
|---|---|---|---|
| | (13) | (14) | (15) |
| Kind | PP | PE | PE |
| Melting point (° C.) | 160 | 134 | 106 |
| MFR (190° C., 2.16 kg) | — | 7.0 | 7.0 |
| MFR (230° C., 2.16 kg) | 9.0 | — | — |
| Tensile modulus at 23° C. (MPa) | 1,300 | 1,050 | 120 |

PP: polypropylene resin
PE: polyethylene resin

Examples 1 to 11 and Comparative Examples 1 to 8: Production of Thermoplastic Polymer Compositions (16) to (34)

Pellets of thermoplastic polymer compositions were produced using the materials described in the above Tables 1 to 6, by melt kneading the materials at 230° C. at the blending ratios indicated in the following Table 7 using a twin-screw extruder, subsequently extruding the materials, and cutting the products.

Examples 12 to 26 and Comparative Examples 9 to 16: Production of Laminates Composed of Three Layers Laminates were produced by the method described in the above section <8. Co-extrusion molding processability> using the pellets of thermoplastic polymer compositions obtained by the method described above, and the acrylic block copolymers (b-1) and the polyolefin-based polymers described in Tables 5 and 6. Specimens were collected from the laminates thus obtained, and the co-extrusion molding processability, delamination resistance, and the 180° peeling strength against acrylic resin plates were evaluated. The results are presented in Table 8 and Table 9.

TABLE 7

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Thermoplastic resin composition | (16) | (17) | (18) | (19) | (20) | (21) | (22) | (23) | (24) | (25) | (26) |

TABLE 7-continued

| Component | | c1 | c2 | c3 | c4 | c5 | c6 | c7 | c8 | c9 | c10 | c11 |
|---|---|---|---|---|---|---|---|---|---|---|---|---|
| Aromatic vinyl-based block copolymer (a-1) | (1) | 35 | 25 | 10 | | | | | | | | |
| | (2) | | | | 35 | | 33 | 35 | 25 | 10 | 35 | 35 |
| | (3) | | | | | 35 | | | | | | |
| Acrylic resin (a-2) | (4) | 35 | 25 | 40 | 35 | 35 | 33 | | 25 | 40 | 35 | 35 |
| | (5) | | | | | | | 35 | | | | |
| Olefin-based polymer containing polar groups (a-3) | (6) | 30 | 50 | 50 | 30 | 30 | 29 | 30 | 50 | 50 | | |
| | (7) | | | | | | | | | | 30 | |
| | (8) | | | | | | | | | | | 30 |
| Polyolefin-based polymer (not containing polar groups) | (13) | | | | | | | | | | | |
| Softening agent (a-4) | (9) | | | | | | 5 | | | | | |

| | | | Comparative Example | | | | | | | |
|---|---|---|---|---|---|---|---|---|---|---|
| | | | 1 | 2 | 3 | 4 | 5 | 6 | 7 | 8 |
| Thermoplastic resin composition | | | (27) | (28) | (29) | (30) | (31) | (32) | (33) | (34) |
| Aromatic vinyl-based block copolymer (a-1) | | (1) | | 50 | | | | | | |
| | | (2) | 45 | | 50 | 35 | 50 | | | |
| | | (3) | | | | | | | | |
| Acrylic resin (a-2) | | (4) | 45 | 50 | 50 | 35 | | 50 | | |
| | | (5) | | | | | | | | |
| Olefin-based polymer containing polar groups (a-3) | | (6) | 10 | | | | 50 | 50 | 100 | |
| | | (7) | | | | | | | | 100 |
| | | (8) | | | | | | | | |
| Polyolefin-based polymer (not containing polar groups) | | (13) | | | | 30 | | | | |
| Softening agent (a-4) | | (9) | | | | | | | | |

TABLE 8

| | | | Example | | | | | | | |
|---|---|---|---|---|---|---|---|---|---|---|
| | | | 12 | 13 | 14 | 15 | 16 | 17 | 18 | 19 |
| Laminate | Substrate layer (C) | Polyolefin-based polymer | (13) | (13) | (13) | (13) | (13) | (13) | (14) | (13) |
| | Layer (A) | Thermoplastic resin composition | (16) | (17) | (18) | (19) | (20) | (19) | (19) | (21) |
| | Pressure-sensitive adhesive layer (B) | Acrylic pressure-sensitive adhesive | (10) | (10) | (10) | (10) | (10) | (11) | (10) | (10) |
| | ($\eta_{Ea}/\eta_{Eb}$) of thermoplastic resin composition | | 8 | 6 | 7 | 7 | 6 | 7 | 7 | 6 |
| | Absolute value of difference between ($\eta_{Ea}/\eta_{Eb}$) of thermoplastic resin composition and ($\eta_{Ex}/\eta_{Ey}$) of acrylic pressure-sensitive adhesive | | 6 | 4 | 5 | 5 | 4 | 6 | 5 | 4 |
| Evaluation | Co-extrusion processability | Surging | + | + | + | + | + | ++ | + | + |
| | | Surface smoothness | ++ | ++ | ++ | ++ | ++ | ++ | ++ | ++ |
| | | Withdrawability | ++ | ++ | ++ | ++ | ++ | + | ++ | ++ |
| | Delamination resistance between substrate layer (C) and layer (A) | | ++ | ++ | + | ++ | ++ | ++ | ++ | ++ |
| | Delamination resistance between layer (A) and pressure-sensitive adhesive layer (B) | | + | + | + | ++ | ++ | ++ | ++ | ++ |
| | 180° peeling strength against PMMA plate (N/25 mm) | | 9 | 9 | 9 | 9 | 9 | 8 | 9 | 9 |

| | | | Example | | | | | | |
|---|---|---|---|---|---|---|---|---|---|
| | | | 20 | 21 | 22 | 23 | 24 | 25 | 26 |
| Laminate | Substrate layer (C) | Polyolefin-based polymer | (13) | (13) | (13) | (13) | (13) | (13) | (15) |
| | Layer (A) | Thermoplastic resin composition | (22) | (23) | (24) | (25) | (26) | (19) | (19) |
| | Pressure-sensitive adhesive layer (B) | Acrylic pressure-sensitive adhesive | (10) | (10) | (10) | (10) | (10) | (12) | (10) |
| | ($\eta_{Ea}/\eta_{Eb}$) of thermoplastic resin composition | | 9 | 6 | 5 | 9 | 9 | 7 | 7 |
| | Absolute value of difference between ($\eta_{Ea}/\eta_{Eb}$) of thermoplastic resin composition and ($\eta_{Ex}/\eta_{Ey}$) of acrylic pressure-sensitive adhesive | | 7 | 4 | 3 | 7 | 7 | 28 | 5 |

TABLE 8-continued

| | | | | | | | | | |
|---|---|---|---|---|---|---|---|---|---|
| Evaluation | Co-extrusion processability | Surging | + | + | + | + | + | + | + |
| | | Surface smoothness | + | ++ | ++ | ++ | ++ | + | ++ |
| | | Withdrawability | ++ | ++ | ++ | ++ | ++ | + | + |
| | Delamination resistance between substrate layer (C) and layer (A) | | ++ | ++ | + | + | ++ | ++ | + |
| | Delamination resistance between layer (A) and pressure-sensitive adhesive layer (B) | | ++ | ++ | ++ | ++ | ++ | ++ | + |
| | 180° peeling strength against PMMA plate (N/25 mm) | | 9 | 9 | 9 | 9 | 9 | 7 | 6 |

TABLE 9

| | | | Comparative Example | | | | | | | |
|---|---|---|---|---|---|---|---|---|---|---|
| | | | 9 | 10 | 11 | 12 | 13 | 14 | 15 | 16 |
| Laminate | Substrate layer (C) | Polyolefin-based polymer | (13) | (13) | (13) | (13) | (13) | (13) | (13) | (13) |
| | Layer (A) | Thermoplastic resin composition | (27) | (28) | (29) | (30) | (31) | (32) | (33) | (34) |
| | Pressure-sensitive adhesive layer (B) | Acrylic pressure-sensitive adhesive | (10) | (10) | (10) | (10) | (10) | (10) | (10) | (10) |
| | (ηEa/ηEb) of thermoplastic resin composition | | 14 | 22 | 15 | 9 | 8 | 7 | 2 | 4 |
| | Absolute value of difference between (ηEa/ηEb) of thermoplastic resin composition and (ηEx/ηEy) of acrylic pressure-sensitive adhesive | | 12 | 20 | 13 | 7 | 6 | 6 | 0.4 | 2 |
| Evaluation | Co-extrusion processability | Surging | − | − | − | + | + | + | + | + |
| | | Surface smoothness | − | − | − | ++ | − | − | ++ | ++ |
| | | Withdrawability | − | − | − | ++ | ++ | ++ | + | + |
| | Delamination resistance between substrate layer (C) and layer (A) | | Not evaluable | Not evaluable | Not evaluable | ++ | + | + | ++ | ++ |
| | Delamination resistance between layer (A) and pressure-sensitive adhesive layer (B) | | Not evaluable | Not evaluable | Not evaluable | − | − | − | − | − |
| | 180° peeling strength against PMMA plate (N/25 mm) | | Not measurable | Not measurable | Not measurable | Not measurable | Not measurable | Not measurable | Not measurable | Not measurable |

The thermoplastic polymer compositions (16) to (26) produced in Examples 1 to 11 had melt viscosities that were advantageous for co-extrusion processing, and the laminates of Examples 12 to 26, each of which included a layer formed from the respective thermoplastic polymer compositions (A) between a pressure-sensitive adhesive layer (B) and a substrate layer (C), had an excellent balance between the co-extrusion molding processability, delamination resistance, and the 180° peeling strength against an acrylic resin plate.

On the other hand, the thermoplastic polymer compositions (27) to (29) produced in Comparative Examples 1 to 3 had high shear velocity dependency, and the laminates of Comparative Examples 9 to 11, each of which included a layer formed from the respective thermoplastic polymer compositions, had poor co-extrusion molding processability. Furthermore, the thermoplastic polymer compositions (30) to (34) produced in Comparative Examples 4 to 8 had low shear velocity dependency, but had low affinity with acrylic pressure-sensitive adhesives. In the laminates of Comparative Examples 12 to 16, each of which had a layer formed from the respective thermoplastic polymer compositions, delamination occurred between the layer formed from a thermoplastic polymer composition and the pressure-sensitive adhesive layer containing an acrylic pressure-sensitive adhesive.

INDUSTRIAL APPLICABILITY

The laminate of the invention can be suitably used as protective films, pressure-sensitive adhesive tapes, labels and the like that are used in the fields of optics, automobile industry, electronics, medicine, construction, environment, and the like.

What is claimed is:

1. A thermoplastic polymer composition consisting of:
   an aromatic vinyl-based block copolymer (a-1) having a number average molecular weight of 30,000 to 200,000, the aromatic vinyl based block copolymer (a-1) comprising: a polymer block F comprising a structural unit derived from an aromatic vinyl-based monomer as a main component; and a hydrogenated or non-hydrogenated polymer block G comprising a structural unit derived from a conjugated diene monomer or an isobutylene monomer as a main component;
   an acrylic polymer (a-2);
   an olefin-based polymer containing polar groups (a-3);
   optionally, a softening agent (a-4); and
   optionally, a component other than the aromatic vinyl-based block copolymer (a-1), acrylic polymer (a-2), olefin-based polymer containing polar groups (a-3) or softening agent (a-4) in an amount of 30 parts by mass or less with respect to 100 parts by mass of a total amount of the aromatic vinyl-based block copolymer (a-1), acrylic polymer (a-2), olefin-based polymer containing polar groups (a-3) and softening agent (a-4), at the proportions satisfying the following Expressions (1) to (3):

$$0.05 \leq W_{(a-2)}/W_{(a-1)} \leq 9 \qquad (1),$$

$$0.15 < W_{(a-3)}/(W_{(a-1)}+W_{(a-2)}+W_{(a-3)}+W_{(a-4)}) \leq 0.9 \qquad (2), \text{ and}$$

$$0 \leq W_{(a-4)}/(W_{(a-1)}+W_{(a-2)}+W_{(a-3)}+W_{(a-4)}) \leq 0.5 \qquad (3)$$

wherein $W_{(a-1)}$, $W_{(a-2)}$, $W_{(a-3)}$ and $W_{(a-4)}$ represent the contents (on a mass basis) of the aromatic vinyl-based block copolymer (a-1), acrylic polymer (a-2), olefin-based polymer containing polar groups (a-3) and softening agent (a-4), respectively, in the thermoplastic polymer composition, and wherein the polymer block F has a number average molecular weight of 1,000 to 50,000, the polymer block G comprises: a polymer block g1, which is a polymer block having a number average molecular weight of 1,000 to 30,000 and in which the content of a 1,4-bond structural unit derived from the conjugated diene monomer that constitutes the polymer block is less than 30 mol %; and a polymer block g2, which is a polymer block having a number average molecular weight of 25,000 to 190,000 and in which the content of a 1,4-bond structural unit derived from the conjugated diene monomer that constitutes the polymer block is 30 mol % or more, and the aromatic vinyl-based block copolymer (a-1) comprises at least one (F-g1-g2) structure.

2. The thermoplastic polymer composition according to claim 1, wherein the ratio of the shear viscosity ηEa (Pa·s) at a shear velocity 1 (1/s) measured at 210° C. to the shear viscosity ηEb (Pa·s) at a shear velocity 100 (1/s) measured at 210° C., (ηEa/ηEb), is 10 or less.

3. The thermoplastic polymer composition according to claim 1, wherein the aromatic vinyl-based monomer is a-methylstyrene.

4. The thermoplastic polymer composition according to claim 1, wherein the olefin-based polymer containing polar groups (a-3) is at least one selected from an ethylene-vinyl acetate copolymer, an ethylene-(meth)acrylic acid ester copolymer, and an ethylene-(meth)acrylic acid copolymer.

5. A laminate comprising:

a layer (A) formed from a thermoplastic polymer composition;

a pressure-sensitive adhesive layer (B) comprising an acrylic pressure-sensitive adhesive; and a substrate layer (C) comprising a polyolefin-based polymer, wherein the layer (A), the pressure-sensitive adhesive layer (B), and the substrate layer (C) are laminated in the order of (B)-(A)-(C), and wherein the thermoplastic polymer composition consists of:

an aromatic vinyl-based block copolymer (a-1) having a number average molecular weight of 30,000 to 200,000, the aromatic vinyl based block copolymer (a-1) comprising: a polymer block F comprising a structural unit derived from an aromatic vinyl-based monomer as a main component; and a hydrogenated or non-hydrogenated polymer block G comprising a structural unit derived from a conjugated diene monomer or an isobutylene monomer as a main component;

an acrylic polymer (a-2);

an olefin-based polymer containing polar groups (a-3);

optionally, a softening agent (a-4); and optionally, a component other than the aromatic vinyl-based block copolymer (a-1), acrylic polymer (a-2), olefin-based polymer containing polar groups (a-3) or softening agent (a-4) in an amount of 30 parts by mass or less with respect to 100 parts by mass of a total amount of the aromatic vinyl-based block copolymer (a-1), acrylic polymer (a-2), olefin-based polymer containing polar groups (a-3) and softening agent (a-4), at the proportions satisfying the following Expressions (1) to (3):

$$0.05 \leq W_{(a-2)}/W_{(a-1)} \leq 9 \qquad (1),$$

$$0.15 < W_{(a-3)}/(W_{(a-1)}+W_{(a-2)}+W_{(a-3)}+W_{(a-4)}) \leq 0.9 \qquad (2), \text{ and}$$

$$0 \leq W_{(a-4)}/(W_{(a-1)}+W_{(a-2)}+W_{(a-3)}+W_{(a-4)}) \leq 0.5 \qquad (3)$$

wherein $W_{(a-1)}$, $W_{(a-2)}$, $W_{(a-3)}$ and $W_{(a-4)}$ represent the contents (on a mass basis) of the aromatic vinyl-based block copolymer (a-1), acrylic polymer (a-2), olefin-based polymer containing polar groups (a-3) and softening agent (a-4), respectively, in the thermoplastic polymer composition.

6. The laminate according to claim 5, wherein the acrylic pressure-sensitive adhesive comprises: an acrylic block copolymer (b-1) comprising at least one polymer block (I-1) composed of a structural unit derived from a methacrylic acid ester; and at least one polymer block (I-2) composed of a structural unit derived from an acrylic acid ester.

7. The laminate according to claim 6, wherein the content of the polymer block (I-1) in the acrylic block copolymer (b-1) is 5% by mass to 50% by mass.

8. The laminate according to claim 6, wherein the structural unit derived from the acrylic acid ester that constitutes the polymer block (I-2) is derived from an acrylic acid ester (i-1) represented by formula: $CH_2=CH-COOR^1$ (P), wherein $R^1$ represents an organic group having 4 to 6 carbon atoms, and an acrylic acid ester (i-2) represented by formula: $CH_2=CH-COOR^2$ (Q), wherein $R^2$ represents an organic group having 7 to 12 carbon atoms, and the mass ratio of the acrylic acid ester (i-1) to the acrylic acid ester (i-2), ((i-1)/(i-2)), is from 90/10 to 10/90.

9. The laminate according to claim 5, wherein the ratio of the shear viscosity ηEx (Pa·s) at a shear velocity 1 (1/s) measured at 210° C. to the shear viscosity ηEy (Pa·s) at a shear velocity 100 (1/s) measured at 210° C., (ηEx/ηEy), of the acrylic pressure-sensitive adhesive is 25 or less.

10. The laminate according to claim 5, wherein the absolute value of the difference between the ratio (ηEa/ηEb) of the shear viscosity ηEa (Pa·s) at a shear velocity 1 (1/s) measured at 210° C. to the shear viscosity ηEb (Pa·s) at a shear velocity 100 (1/s) measured at 210° C. of the thermoplastic polymer composition, and the ratio (ηEx/ηEy) of the shear viscosity ηEx (Pa·s) at a shear velocity 1 (1/s) measured at 210° C. to the shear viscosity ηEy (Pa·s) at a shear velocity 100 (1/s) measured at 210° C. of the acrylic pressure-sensitive adhesive, is 10 or less.

11. The laminate according to claim 5, wherein the polyolefin-based polymer that constitutes the substrate layer (C) is a polypropylene-based polymer.

12. The laminate according to claim 5, wherein the layers of (A) to (C) are laminated using a co-extrusion molding processing method.

13. A protective film comprising the laminate according to claim 5.

14. A thermoplastic polymer composition consisting of:
an aromatic vinyl-based block copolymer (a-1) having a number average molecular weight of 30,000 to 200,000, the aromatic vinyl based block copolymer (a-1) comprising: a polymer block F comprising a structural unit derived from an aromatic vinyl-based monomer as a main component; and a hydrogenated or non-hydrogenated polymer block G comprising a structural unit derived from a conjugated diene monomer or an isobutylene monomer as a main component;
an acrylic polymer (a-2);
an olefin-based polymer containing polar groups (a-3);
optionally, a softening agent (a-4); and
optionally, a component other than the aromatic vinyl-based block copolymer (a-1), acrylic polymer (a-2), olefin-based polymer containing polar groups (a-3) or softening agent (a-4) in an amount of 30 parts by mass or less with respect to 100 parts by mass of a total amount of the aromatic vinyl-based block copolymer (a-1), acrylic polymer (a-2), olefin-based polymer containing polar groups (a-3) and softening agent (a-4), at the proportions satisfying the following Expressions (1) to (3):

$$0.05 \leq W_{(a-2)}/W_{(a-1)} \leq 9 \quad (1),$$

$$0.15 < W_{(a-3)}/(W_{(a-1)}+W_{(a-2)}+W_{(a-3)}+W_{(a-4)}) \leq 0.9 \quad (2), \text{ and}$$

$$0 \leq W_{(a-4)}/(W_{(a-1)}+W_{(a-2)}+W_{(a-3)}+W_{(a-4)}) \leq 0.5 \quad (3)$$

wherein $W_{(a-1)}$, $W_{(a-2)}$, $W_{(a-3)}$ and $W_{(a-4)}$ represent the contents (on a mass basis) of the aromatic vinyl-based block copolymer (a-1), acrylic polymer (a-2), olefin-based polymer containing polar groups (a-3) and softening agent (a-4), respectively, in the thermoplastic polymer composition, and wherein the content of structural units having the polar group in the olefin-based polymer containing polar groups (a-3) is from 5% by mass to 50% by mass.

15. The thermoplastic polymer composition according to claim 14, wherein the content of structural units having the polar group in the olefin-based polymer containing polar groups (a-3) is from 10% by mass to 30% by mass.

16. The thermoplastic polymer composition according to claim 14, wherein the ratio of the shear viscosity ηEa (Pa·s) at a shear velocity 1 (1/s) measured at 210° C. to the shear viscosity ηEb (Pa·s) at a shear velocity 100 (1/s) measured at 210° C., (ηEa/ηEb), is 10 or less.

17. The thermoplastic polymer composition according to claim 14, wherein the polymer block F has a number average molecular weight of 1,000 to 50,000, the polymer block G comprises: a polymer block g1, which is a polymer block having a number average molecular weight of 1,000 to 30,000 and in which the content of a 1,4-bond structural unit derived from the conjugated diene monomer that constitutes the polymer block is less than 30 mol %; and a polymer block g2, which is a polymer block having a number average molecular weight of 25,000 to 190,000 and in which the content of a 1,4-bond structural unit derived from the conjugated diene monomer that constitutes the polymer block is 30 mol % or more, and the aromatic vinyl-based block copolymer (a-1) comprises at least one (F-g1-g2) structure.

18. The thermoplastic polymer composition according to claim 14, wherein the aromatic vinyl-based monomer is α-methylstyrene.

19. The thermoplastic polymer composition according to claim 14, wherein the olefin-based polymer containing polar groups (a-3) is at least one selected from an ethylene-vinyl acetate copolymer, an ethylene-(meth)acrylic acid ester copolymer, and an ethylene-(meth)acrylic acid copolymer.

* * * * *